(12) United States Patent
Tatrai et al.

(10) Patent No.: US 12,106,572 B2
(45) Date of Patent: Oct. 1, 2024

(54) REAL-TIME CROWD MEASUREMENT AND MANAGEMENT SYSTEMS AND METHODS THEREOF

(71) Applicant: DYNAMIC CROWD MEASUREMENT PTY LTD, Campbelltown (AU)

(72) Inventors: Andrew Tatrai, Campbelltown (AU); Travis Lachlan Semmens, Campbelltown (AU)

(73) Assignee: DYNAMIC CROWD MEASUREMENT PTY LTD, Campbelltown (AU)

( * ) Notice: Subject to any disclaimer, the term of this patent is extended or adjusted under 35 U.S.C. 154(b) by 437 days.

(21) Appl. No.: 17/628,337

(22) PCT Filed: Apr. 27, 2020

(86) PCT No.: PCT/AU2020/050402
§ 371 (c)(1),
(2) Date: Jan. 19, 2022

(87) PCT Pub. No.: WO2021/011992
PCT Pub. Date: Jan. 28, 2021

(65) Prior Publication Data
US 2022/0254161 A1    Aug. 11, 2022

(30) Foreign Application Priority Data

Jul. 24, 2019 (AU) ................................ 2019100806

(51) Int. Cl.
*G06V 20/52* (2022.01)
*G06N 3/045* (2023.01)
(Continued)

(52) U.S. Cl.
CPC ............. *G06V 20/53* (2022.01); *G06N 3/045* (2023.01); *G06N 7/01* (2023.01); *G06T 7/292* (2017.01);
(Continued)

(58) Field of Classification Search
None
See application file for complete search history.

(56) References Cited

U.S. PATENT DOCUMENTS 8,527,340 B2 * 9/2013 Fisher ..................... G06F 16/58
705/14.5
9,020,832 B2 * 4/2015 Fisher ..................... G06F 16/78
705/14.1
(Continued)

OTHER PUBLICATIONS

Semmens, T. et al. 2016. "Dynamic Crowd Measurement." Retrieved from Internet on Jun. 9, 2020.
(Continued)

*Primary Examiner* — Anand P Bhatnagar
(74) *Attorney, Agent, or Firm* — E. Eric Mills; Nicholas P. Stadnyk; Maynard Nexsen PC

(57) ABSTRACT

Embodiments of the present disclosure provides a real-time crowd measurement and management system including data capturing devices installed in a plurality of zones for continuously capturing crowd data of a plurality of crowds in a plurality of zones. The system also includes an analysis module for identifying crowd characteristics from the crowd data; analyzing the crowd data to determine one or more patterns and changes in mood of the plurality of crowds; and predicting crowd information comprising emergent crowd characteristics, an emergent crowd behaviour of the crowds, and one or more issues based on the analysis in real-time. The system also includes a display module for displaying the predicted crowd information along with at least one of an alert and at least one indicator in real-time.

20 Claims, 6 Drawing Sheets

(51) Int. Cl.
*G06N 7/01* (2023.01)
*G06T 7/292* (2017.01)
*G06T 7/70* (2017.01)
*G06V 10/82* (2022.01)
*G06V 40/10* (2022.01)
*G06V 40/20* (2022.01)

(52) U.S. Cl.
CPC ............... *G06T 7/70* (2017.01); *G06V 10/82* (2022.01); *G06V 40/10* (2022.01); *G06V 40/20* (2022.01); *G06T 2200/24* (2013.01); *G06T 2207/20081* (2013.01); *G06T 2207/20084* (2013.01); *G06T 2207/30196* (2013.01); *G06T 2207/30232* (2013.01); *G06T 2207/30241* (2013.01); *G06T 2207/30242* (2013.01)

(56) References Cited

U.S. PATENT DOCUMENTS

| | | | | |
|---|---|---|---|---|
| 10,614,317 | B2 * | 4/2020 | Oami | G06F 3/013 |
| 10,683,088 | B2 * | 6/2020 | Erickson | G06N 7/01 |
| 10,904,704 | B2 * | 1/2021 | Benrachi | G06Q 50/26 |
| 11,367,083 | B1 * | 6/2022 | Saurabh | G06Q 30/02 |
| 2009/0222388 | A1 * | 9/2009 | Hua | G06N 5/02 |
| | | | | 382/103 |
| 2009/0296989 | A1 * | 12/2009 | Ramesh | G06V 20/52 |
| | | | | 382/103 |
| 2014/0075004 | A1 * | 3/2014 | Van Dusen | G07C 13/00 |
| | | | | 709/223 |
| 2015/0206027 | A1 * | 7/2015 | Fisher | G06F 16/78 |
| | | | | 382/225 |
| 2017/0341746 | A1 * | 11/2017 | Erickson | B64C 39/024 |
| 2019/0266411 | A1 * | 8/2019 | Oami | G06V 20/52 |

OTHER PUBLICATIONS

"Monica demonstrations at the Emerald Headingley Cricket Ground", Oct. 1, 2018. Retrieved from Internet on Jun. 9, 2020.

Hamburg, J. B., "Surveillance, crowd control and privacy in the age of the Internet of Things", Apr. 9, 2014. Retrieved from Internet on Jun. 9, 2020.

"Video analytics monitors crowd size, density and flow", Apr. 12, 2019. Retrieved from Internet on Jun. 9, 2020.

International Search Report and Written Opinion issued in counterpart PCT Application No. PCT/AU2020/050402 dated Jun. 11, 2020 (eleven (11) pages).

* cited by examiner

REAL-TIME CROWD MEASUREMENT AND MANAGEMENT SYSTEMS AND METHODS THEREOF

CROSS REFERENCE TO RELATED APPLICATIONS

This application is a 35 U.S.C. § 371 U.S. national phase entry of International Application No. PCT/AU2020/050402 having an international filing date of Apr. 27, 2020, which claims priority to Australian Patent Application No. 2019100806 filed Jul. 24, 2019; the entireties of which are hereby incorporated by reference herein.

TECHNICAL FIELD

The presently disclosed subject matter generally relates to the field of data processing and analysis. Particularly, the present subject matter relates to systems and methods for quantitatively measuring crowd in real-time and provide crowd management insight to crowd and event managers. The systems and methods also predict behaviour of the crowds or individual(s) in the crowd, potential safety issues by constantly analyzing crowd data including crowd mood, flow, and density, movement speed and direction, and continuous actions etc. collected by different remote (noncontact) sensing technologies.

BACKGROUND

Any references to methods, apparatus or documents of the prior art are not to be taken as constituting any evidence or admission that they formed, or form part of the common general knowledge.

Events like entertainment events, concerts, marathon run, music festivals etc. attract lot of crowds. Many times, special arrangements need to be done for managing the crowd and their safety. Usually, the effective management of crowds requires event organizers to determine important characteristics and metrics of crowds. For example, how many people are expected at what times, and their behaviour. Further, event organizers may require to respond in real time for taking some decisions to manage the crowds. The knowledge on crowd science is still lacking definitive techniques to define changes in crowd safety levels.

Many of the existing crowd measurement methodologies have been based on the production of crowd simulations in a computer-generated environment, allowing for experimentation based on underlying mathematical models describing crowd dynamics and how individuals behave under specific situation. Recognizing the limitations of computer simulation, as well as their often-prohibitive complexity, some existing crowd measurement methods use a broader approach based on modeling crowd behaviour by conducting a variety of experiments in a controlled environment beforehand. However, the fundamental limitation of the crowd simulation and crowd modeling methods remains that they depend on, and are limited by, the data and assumptions used to generate the crowd measurements.

Further, poor, inaccurate or unsuitable data and assumptions in turn can produce poor, inaccurate and unsuitable measurements and results. Therefore, current crowd modeling methodologies can be flawed as they rely on a narrow set of assumptions based on an inappropriate set of information such as, the event organizer's forecast figures and transportation capacities to be used as a basis for crowd estimations and measurement for the event. The underlying issues in existing methodologies remain that the attempts at forecasting risk based on those assumptions could not furnish necessary proof for why a situation/emergency occurred and what management actions should be taken.

Other crowd data collection methods such as photoelectric detection methods using camera and pressure sensor are being used for crowd measurement. Using camera, the shape of the object to be detected requires a unified specification, strictly consistent locomotor activity. There are many factors to consider for crowd flow detection For example: people walking randomly out of a store, in order to distinguish, but also leave gaps from each other, so this photoelectric detection method of detecting the flow rate of the population, regardless of the mounting position of the individuals' behaviour have more stringent requirements, especially to implement the specific is large places like malls, concerts, stadiums have great difficulty. Using pressure sensing method, while individual differences of people require less, but still require individuals to turn out, not crowded, otherwise, it may still malfunction. A high-performance pressure sensor, capable of long-term stability may be required for the pressure sensing methods. The equipment needed for the pressure sensing methods is very complex and costly and may not be conducive to the implementation of the promotion or big event.

In light of the above, it's evident that technologies haven't be implemented successfully and thoroughly into crowd control or crowd management situations and current crowd counting software is empirical and limited. Moreover, human bias, inconsistent experience and observation is a limiting factor in crowd analysis. Further, current collection and analysis of crowd data is inefficient and inaccurate. There is a current inability to collect unbiased and complete data sets for crowd behaviours and thus leads to the low accuracy and low confidence on crowd pattern predictability.

It is an object of the present disclosure to overcome or ameliorate the above discussed disadvantages of the prior art, or at least offer a useful alternative.

SUMMARY

The present disclosure provides a real-time crowd measurement and management system and method for accurately collecting, measuring and analyzing crowd characteristics to predict emergent crowd behaviour and potential crowd safety and congestion issues in real-time. The crowd characteristics or metrics may include, but are not limited to, a crowd density, a crowd flow, and a crowd mood. The predicted emergent crowd behaviour may help decision makers, for example, event organizers, managers, etc. in informed decision making for taking measures for crowd management and safety.

The present disclosure provides a real-time crowd measurement and management system and a method for accurately measuring and analyzing crowds' characteristics of a plurality of crowds present in a plurality of zones to predict emergent crowd behaviour, potential crowd safety/congestion issues, and/or suggest one or more actions for managing crowds.

An embodiment of the present disclosure provides a real-time crowd measurement and management system. The system includes a data collection module including a plurality of data capturing devices installed in a plurality of zones, respectively. The plurality of data capturing devices are configured to continuously capture crowd data of a plurality of crowds in the plurality of zones. Each of the plurality of crowds may include a number of people. The facial features and personal information of the plurality of people in the plurality of crowds may not be recorded or retained while capturing the crowd data of the plurality of crowds. The system also includes an analysis module configured to identify a plurality of crowd characteristics from the captured crowd data. The crowd characteristics may include at least one of a crowd density, a crowd flow, and a crowd mood. The analysis module analyses the captured crowd data to determine one or more patterns and changes in mood of the plurality of crowds. The analysis module predicts crowd information comprising at least one of one or more emergent crowd characteristics, an emergent crowd behaviour of the plurality of crowds, and one or more issues based on the analysis in real-time. The system also includes a display module configured to display the predicted crowd information along with at least one of an alert and at least one indicator in real-time.

According to another aspect of the present disclosure, the crowd characteristics may include one or more quantitative crowd characteristics and one or more qualitative crowd characteristics, wherein the one or more quantitative crowd characteristics comprises a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive. The mood score may be further configured, into different categories and levels, wherein a category may comprise values like unknown, neutral, happy, sad, surprise, disgust, worried, fear, and anger, and a level may comprise values like low, medium, and high.

According to another aspect of the present disclosure, the analysis module may further be configured to: analyze the crowd data to create a context for the analysis of crowd behaviour; examine and measure a relationship between two quantitative metrics and one qualitative assessment to increase predictability of crowd information comprising the crowd behaviour; and suggest one or more actions for managing the plurality of crowds based on the crowd information.

According to another aspect of the present disclosure, the display module may be configured to display the one or more actions; and display at least one of the crowd information, the one or more actions and the one or more suggestions as a graphical representation. The at least one indicator comprising a colour indicator for denoting the crowd information comprising crowd feeling in real-time.

According to another aspect of the present disclosure, the data collection module may further be configured to receive the crowd data from a plurality of observers present in the plurality of zones via a computing device and a network.

The analysis module may be configured to predict the one or more patterns and changes in mood of the plurality of crowds based on predictive Bayesian network; measure the crowd characteristics by using artificial intelligence and convolutional neural networks (CNN); measure a speed of change in the crowd density, flow and mood of the plurality of crowds in the zones, a trend and a rate of the trend in the crowd density, flow and mood; and indicate the one or more issues comprising possible crowd congestion and crowd crush risks based on the speed of change in the crowd density, crowd flow and crowd mood.

According to yet another aspect of the present disclosure, the real-time crowd measurement and management system may further include a machine learning module configured to continually improve an accuracy and predictive capability of the real-time crowd measurement and management system.

In an embodiment, the real-time crowd measurement and management may be present in a cloud network.

Another embodiment of the present disclosure provides a method for measuring and managing crowd in real-time. The method includes continuously capturing, by a plurality of data capturing devices of a data collection module, crowd data of a plurality of crowds present in a plurality of zones. Each of the plurality of crowds includes a number of people. The method further includes identifying, by an analysis module, a plurality of crowd characteristics from the captured crowd data. The crowd characteristics may include at least one of a crowd density, a crowd flow, and a crowd mood. The method also includes analyzing, by the analysis module, the captured crowd data to determine one or more patterns and changes in mood of the plurality of crowds. The method further includes predicting, by the analysis module, crowd information comprising at least one of one or more emergent crowd characteristics, an emergent crowd behaviour of the plurality of crowds, and one or more issues based on the analysis in real-time. The method furthermore includes displaying, by a display module, the predicted crowd information along with at least one of an alert and at least one indicator in real-time.

According to an aspect of the present disclosure, the method further includes analyzing, by the analysis module, the crowd data to create a context for the analysis of crowd behaviour; measuring, by the analysis module, a relationship between two quantitative metrics and one qualitative assessment to increase predictability of crowd information including the crowd behaviour; and suggesting, by the analysis module, one or more actions based on the crowd information. According to another aspect of the present disclosure, the method further includes displaying, by the display module, the one or more actions; and displaying, by the display module, the crowd information and the one or more actions as a graphical representation, wherein the display module displays at least one of the crowd information, the one or more actions and the one or more suggestions as a graphical representation.

According to another aspect of the present disclosure, the method may also include predicting, by the analysis module, the one or more patterns and changes in mood of the plurality of crowds based on predictive Bayesian network. According to another aspect of the present disclosure, the method further includes measuring, by the analysis module, the crowd characteristics by using artificial intelligence and convolutional neural networks (CNN); measuring, by the analysis module, a speed of change in the crowd density, flow and mood of the plurality of crowds in the zones, a trend and a rate of the trend in the crowd density, flow and mood; and predicting, by the analysis module, the one or more issues comprising possible crowd congestion and crowd crush risks based on the speed of change in the crowd density, crowd flow and crowd mood.

The method may further include receiving, by the data collection module, the crowd data from a plurality of observers present in the plurality of zones via a computing device and a network; continually improving, by a machine learning module, an accuracy and predictive capability of the real-time crowd measurement and management system; distinguishing, by the analysis module for each of the plurality of people, between facial and head movements that are not related to a mood of each of the plurality of people.

A yet another embodiment of the present disclosure provides a real-time crowd measurement and management system. The system includes a data collection module comprising a plurality of data capturing devices installed in a plurality of zones, the plurality of data capturing devices are configured to continuously observe and collect first set of crowd data comprising quantitative data and qualitative data of a plurality of crowds, wherein each of the plurality of crowds comprising a plurality of people, wherein the data collection module is further configured to receive a second set of crowd data from a plurality of observers present at the plurality of zones via a computing device and a network, wherein the data capturing devices are configured not to record any facial features and personal information of the plurality of people in the plurality of crowds. The system also includes an analysis module configured to use artificial intelligence and convolutional neural networks (CNN) to identify a plurality of crowd characteristics from the first set of crowd data and the second set of crowd data, wherein the crowd characteristics comprising one or more quantitative crowd characteristics and one or more qualitative crowd characteristics, wherein the crowd characteristics comprising at least one of a crowd density, a crowd flow, and a crowd mood; analyze the captured crowd data to determine one or more patterns and changes in mood of the plurality of crowds and create a context for the analysis of crowd behaviour; examine and measure a relationship between two quantitative crowd characteristics and one qualitative assessment to increase predictability of crowd information comprising behaviour; predict crowd information comprising at least one of one or more emergent crowd characteristics, an emergent crowd behaviour of the plurality of crowds, and one or more issues based on the analysis in real-time; and suggest one or more actions for managing the plurality of crowds based on the crowd information. The system also includes a display module configured to display the one or more actions and the predicted crowd information along with at least one of an alert and at least one indicator in real-time, wherein the at least one indicator comprising a colour indicator for denoting the crowd information comprising crowd feeling in real-time. The system further includes a machine learning module configured to continually improve an accuracy and predictive capability of the real-time crowd measurement and management system.

The one or more quantitative crowd characteristics may comprise a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive. The mood score may be further configured into different categories and levels, wherein a category may comprise values like unknown, neutral, happy, sad, surprise, disgust, worried, fear, and anger, and a level may comprise values like low, medium, and high.

The analysis module may be configured to determine the one or more patterns and changes in mood of the plurality of crowds based on predictive Bayesian network; and measure the crowd characteristics by using artificial intelligence and convolutional neural networks (CNN). Further, for each of the plurality of people, the analysis module may distinguish between facial and head movements that are not related to a mood of each of the plurality of people. The data capturing devices may be configured not to record any facial features and personal information of the plurality of people of the plurality of crowds.

The system may also include a notification module configured to send notification and programmed alerts to users of the real-time crowd measurement and management system.

Another embodiment of the present disclosure provides a non-transitory computer-readable storage medium measuring and managing crowd in real-time, when executed by a computing device, cause the computing device to: continuously capture crowd data of a plurality of crowds in a plurality of zones, wherein each of the plurality of crowds comprising a plurality of people; identify a plurality of crowd characteristics from the captured crowd data, wherein the crowd characteristics comprising at least one of a crowd density, a crowd flow, and a crowd mood; analyze the captured crowd data to determine one or more patterns and changes in mood of the plurality of crowds; predict crowd information comprising at least one of one or more emergent crowd characteristics, an emergent crowd behaviour of the plurality of crowds, and one or more issues based on the analysis in real-time; and display the predicted crowd information along with at least one of an alert and at least one indicator in real-time.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
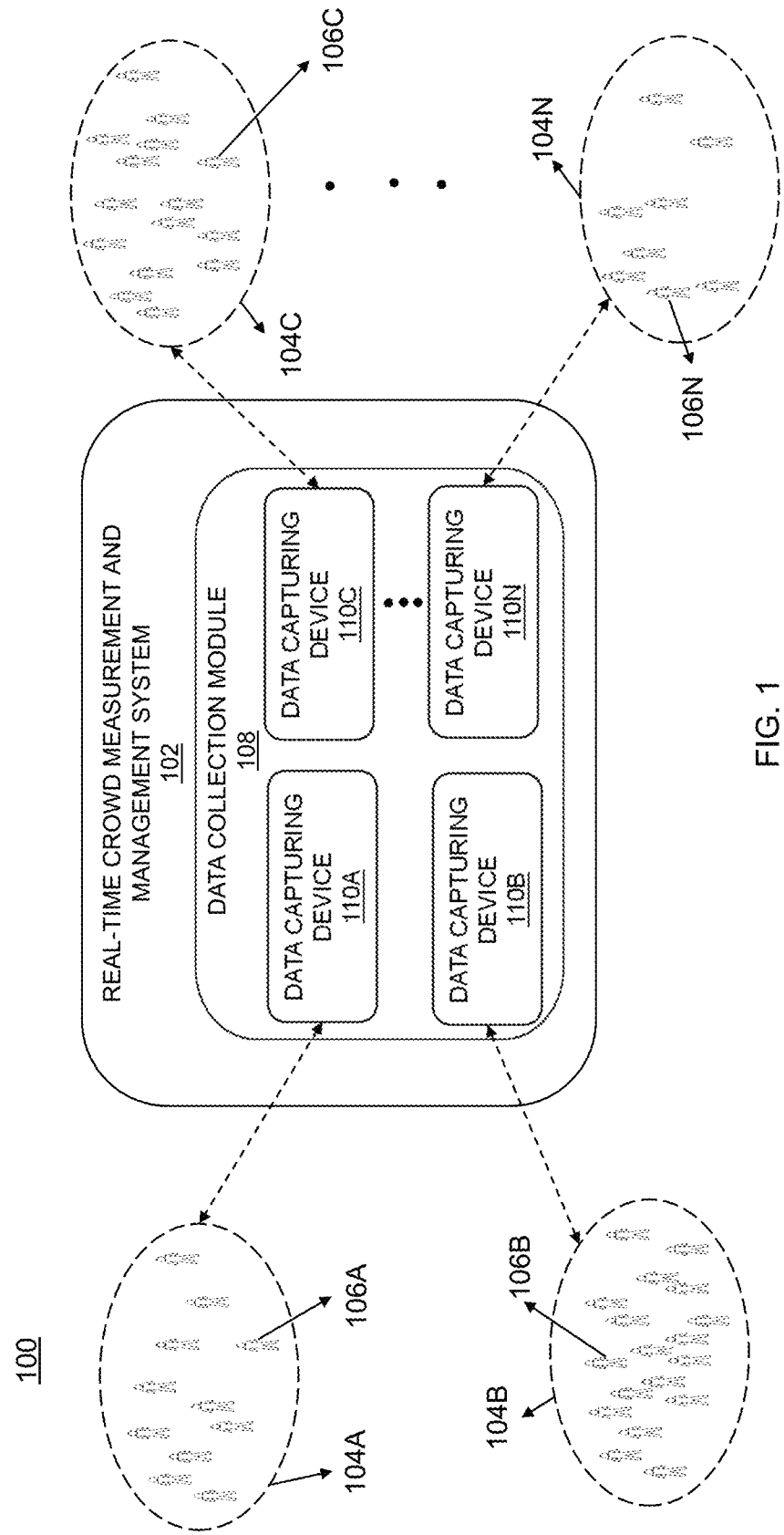
FIG. 1 is a schematic diagram illustrating an exemplary environment, where various embodiments of the present disclosure may function.

Preferred features, embodiments and variations of the invention may be discerned from the following detailed description which provides sufficient information for those skilled in the art to perform the invention. The detailed description is not to be regarded as limiting the scope of the preceding summary of the invention in any way.

The functional units described in this specification have been labeled as devices or modules. A device or module may be implemented in programmable hardware devices such as CPUs, tensor processors, field programmable gate arrays (FPGA), cloud computation units, distributed computation units, or the like. The devices and modules may also be implemented in software for execution by various types of processors. An identified device or module may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Furthermore, the described features, structures, or characteristics may be combined in any suitable manner in one or more embodiments.

In accordance with the exemplary embodiments, the disclosed computer programs or modules can be executed in many exemplary ways, such as an application that is resident in the memory of a device/module or as a hosted application that is being executed on a server and communicating with the device application or browser via a number of standard protocols, such as TCP/IP, HTTP/S, XML, SOAP, REST, JSON, MQTT, RTSP, HLS, TLS, SSL and other sufficient protocols. The disclosed computer programs can be written in complied programming languages that execute from memory on the device or from a hosted server, such a C, C++, Java, or interpreted languages such as JavaScript, Python, HTML, CSS, Node.js, .NET Core, Ruby, PHP, Perl or other sufficient programming languages. Other software technologies like, ReactJS/Redux, Visual Studio Code, WebStorm, NPM 4+, Postgres database, DynamoDB, WebSocket, or any AWS Services may be used to develop the disclosed system.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

FIG. 1 is a schematic diagram illustrating an exemplary environment 100, where various embodiments of the present disclosure may function. As shown, the environment 100 includes a real-time crowd measurement and management system 102. The real-time crowd measurement and management system 102 may include hardware, software, firmware, and combination of these. Further, the real-time crowd measurement and management system 102 may be a single device or module or may include multiple devices or modules. The real-time crowd measurement and management system 102 (hereinafter may be referred as a system 102) may be present in a computing device or may be present in a remote network device like a server in a network. Alternatively, the system 102 may be present in a cloud network or a cloud-based network. Further, one or more modules of the system 102 may be installed on a mobile computing device as a mobile application. Examples of computing device may include such as, but not limited to, a computer, a phone, a smart phone, a laptop, a fitness tracker, a smart watch, a personal digital assistant, a tablet computer, and so forth.

The system 102 may be present on a computing device like a mobile phone, tablet computer, computer. In such embodiments, a user may access the system 102 on the computing device. The system 102 may be a mobile application running on the computing device. Alternatively, the system 102 may be accessed via a web browser. Further, the system 102 may authenticate an identity of a user based on his/her login credentials like name, password, etc. before providing an access to the system 102.

The system 102 is configured to measure and manage an emergent crowd behaviour. The system 102 utilizes artificial intelligence and CNN for accurate, non-biased identification and measurement of crowd characteristics, hence removing human bias from the crowd decision making process. The CNNs are mathematical models that may allow the capturing and learning of complex features in images (i.e. the captured crowd data) to understand scenes, and extract useful information in an autonomous manner. The CNN may be used for object detection to recognize patterns such as edges (vertical/horizontal), shapes, colours, and textures in the crowd data. Further, the CNN may filter the crowd data, and transform the crowd data by using a specific pattern/feature.

The system 102 includes a data collection module 108 includes a number of data capturing devices 110A-110N installed in a number of zones 104A-104N, respectively. Each of the zones 104A-104N may include a crowd. For example, the zone 104A includes a crowd 106A, the zone 104B includes a crowd 106B, the zone 104C includes a crowd 106C, and similarly the zone 104N includes a crowd 106N.

The data capturing devices 110A-110N are configured to continuously observe and capture crowd data of a plurality of crowds i.e. the crowds 106A-106N in the zones 104A-104N. Further, the data capturing devices 110A-110N, for example, the cameras, may be programmed via Convolutional neural networks (CNN) to record density flow and speed. The crowd may include multiple people. The number of people in the crowd may change, i.e. at a particular time like 10 AM, there may be less people in the crowd at a zone like the zone 104B, and at other time 3 PM, there may be more people in the zone like the zone 104B.

The data capturing devices 110A-110N may include CCTV cameras and preserved vision is held from many cameras in nearly all public places of mass gathering. In an example, a 6K, 24 MP (megapixel) high resolution camera is used as the data capturing devices 110A-110N. Further, the camera may include a weatherproof housing unit. The camera may be a standalone camera, computer pods may be deployed to collect and analyze data at any other location. The data capturing devices 110A-110N may have wireless network connection, for example, the camera may have a wireless 4G network connection. In some embodiments, the data capturing devices 110A-110N (or the cameras) may also include an on-board processing unit. The system 102 may use IoT models for the data capturing devices 110A-110N provisioning and data aggregation.

In some embodiments, the data capturing devices 110A-110N may collect input data (i.e. the crowd data or data about an individual) using different remote (and/or non-contact) sensing technologies.

The data capturing devices 110A-110N may identify a plurality of characteristics from the captured crowd data. The crowd characteristics including such as, but not limited to, a crowd density, a crowd flow, and a crowd mood. The crowd characteristics may include one or more quantitative crowd characteristics and one or more qualitative crowd characteristics. The one or more quantitative crowd characteristics may include such as, but not limited to, a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive. The mood score may be further configured into different categories and levels, wherein a category may comprise values like unknown, neutral, happy, sad, surprise, disgust, worried, fear, and anger, and a level may comprise values like low, medium, and high. The data capturing devices 110A-110N is further configured to measure the crowd characteristics by using artificial intelligence and convolutional neural networks (CNN). The data capturing devices 110A-110N is further configured to measure a speed of change in the crowd density, flow, and mood of the crowds 106A-106N in the zones 104A-104N, respectively.

The system 102 may measure the crowd density based on a placement 1-meter square sample areas, marked on the ground at different crucial points throughout the venue where crowd densities are expected to be highest. In an example, trained crowd observers may then be allocated to these sample areas and count the number of people standing in the marked space, reporting these numbers to the control room where it will then be produced into an average measurement of people per meter square. The sample areas may be placed at points at various points across the site to provide a range of measurements. Sample areas should firstly be positioned at points of maximum static crowd density. This may change according to the nature of the event, the space in question as well as the time. For example, for a music event, crowd density will likely accumulate at the front of the stage during a headline performance though this may shift during intermissions or breaks. Similarly, at a large public event with artwork installations on display, a crowd density is likely to accumulate according to different viewing points. Additional sample areas may then also be placed throughout the site at areas where crowd densities may vary as the event progresses, such as at entrances and exits.

The crowd flow may be an indicator of the crowd force. Force is noted as "mass×acceleration". The crowd flow is defined as the number of people crossing a one-meter wide space per minute (people/m²/minute), and may be measured in the same manner as crowd density through the designation of a set measurement areas across the site. A one-meter line or virtual gate will be marked across ingress/egress points, as well as areas internal to the venue in which pedestrian flow would be susceptible to congestion. This would assist staff in counting the numbers of pedestrians entering, exiting and transiting through the area. Intervals of one meter marked on these lines by alternating colours may serve two purposes. Major crowd tragedies have occurred when large bodies of people converge to a small space, crowd flow decreases and force increases. The decrease in the speed of crowd flow is a key metric for crowd managers to prioritize the speed of response needed. As such, crowd flow should be understood as a pre-emptive indicator that can be used by experienced practitioners to trigger prepared contingency measures. In relation to crowd flow, the system 102 is concerned with rapid decreases in crowd flow, which is indicative of decreased mobility and possible crowd congestion or crowd crush scenario. Rapid decreases in crowd flow then correspond with increased observation measurements via a higher monitor interval frequency.

The system 102 may use the interaction between crowd flow and crowd density at specific critical points in a site to highlight or determine a Critical Congestion Point (CCP). The Critical Congestion Point represents the point at which a decrease in crowd flow corresponding with an increase in crowd density transforms pedestrian traffic into a crowd. The CCP in turn indicates when traffic management strategies to decrease the flow into the crowded area must also be combined with crowd management strategies to safely and quickly clear the congested area.

In some embodiments, measurement of crowd flow at the allocated measurement points will be facilitated through the system 102, using a sliding scale of 0 to 130+ people per meter per minute. The crowd mood is an important component of overall crowd behaviour, and one which also interrelates with the crowd density and flow. For example, an increase in the crowd density and flow may often correspond with a change in mood of the crowd as increased congestion and crowding results in elevated levels of anxiety, stress and discomfort. Furthermore, the crowd mood is also an important metric or characteristic for the successful performance of an event, and event managers and operators need to be able to project and maintain a mood that is appropriate for the event and expected amongst event patrons. In relation to crowd mood, the system 102 is configured to monitor rapid negative changes in crowd mood, which is indicative of changes in crowd behaviour and possible issues including, but not limited to, crowd congestion and crowd crush. Rapid decreases in the crowd mood then correspond with increased observation measurements via a higher monitor interval frequency. The system 102 may measure the crowd mood by dividing it into positive and negative categories, which can be more readily associated with an assessment of whether action is necessary and what sort of action is necessary. Under this model, a positive crowd mood is associated with cooperation of the crowd and ease of instruction and direction, which is most conducive to management of risks. A negative crowd mood may be associated with difficulty of crowd instruction and a lack of cooperation, that may in turn elevate the risks of injury as well as making management of such risks increasingly difficult for event organizers, staff and security.

In an example, the system 102 may use a sliding scale of 1 to 10 for indicating the crowd mood, where 1 may indicate strong negative mood and 10 may indicate strong positive mood. A strong positive mood may mean that the crowd is cohesive and cooperative. Instructions and directions from event and security staff are readily and immediately obeyed by the crowd. Further, it means that the crowd is comfortable and very satisfied with the running of the event. Similarly, a strong negative mood may indicate that there are increased instances of antisocial behaviour, and there is potential for sudden bursts and surges in energy of the crowd. Further, it means that there is resistance to and lack of cooperation with security and event staff and crowd is uncomfortable and not satisfied with the running of the event.

The system 102 may also analyze the captured crowd data to determine one or more patterns and changes in mood of the crowds 106A-106N. In some embodiments, the system 102 may be configured to determine the one or more patterns and changes in mood of the plurality of crowds based on predictive Bayesian network (or Big-data predictive Bayesian network analysis).

Further, the system 102 may be configured to examine and measure a relationship between two quantitative metrics and one qualitative assessment to increase predictability of crowd information comprising the crowd behaviour. The quantitative metrics or inputs are crowd density and flow measured as numbers, and qualitative assessment is crowd mood measured qualitatively that may be negative, neutral or positive. In some embodiments, the system 102 may be configured to suggest one or more actions for managing the plurality of crowds 106A-106N based on the crowd information. In some embodiments, the system 102 may be configured to analyze the crowd data to create a context for the analysis of crowd behaviour. Further, the system 102 may predict crowd information including such as, but not limited to, one or more emergent crowd characteristics, an emergent crowd behaviour of the crowds 106A-106N, and one or more issues that may arise based on the analysis in real-time. In some embodiments, the real-time measurement and management system 102 indicates the one or more issues comprising possible crowd congestion and crowd crush risks based on the speed of change in the crowd density, crowd flow and crowd mood.

In some embodiments, the system 102 is configured to receive the crowd data from a plurality of observers present in the zones 104A-104N via a computing device like a mobile phone in a network. The observers may include ground staff or officials manually providing crowd data to the real-time crowd measurement and management system 102 via the computing device like mobile phone based on their observation of the crowds 106A-106N in the zones 104A-104N, respectively. The system 102 may also be configured to display the predicted crowd information along with at least one of an alert and at least one indicator in real-time. The at least one indicator may be a colour indicator for denoting the crowd information for example crowd feeling in real-time. When the system 102 detects a rapid increase in density and decrease in flow and mood, it responds by producing alerts based on a pre-set or predetermined crowd levels. When these pre-set levels are reached, the alert or notification 'yellow flags' or 'red flags' an area where crowd congestion requires control and mitigation actions or techniques. The storage system or database of the system 102 provides a reference library which matches the observation data to the most effective and appropriate control and mitigation technique. The system 102 is also configured to send notification and programmed alerts to users of the real-time crowd measurement and management system 102. For example, the users may access the system 102 via their associated computing device like a smart phone.

The system 102 may also display the one or more actions on an output medium like a screen of the computing device. In some embodiments, the system 102 may display the crowd information and the one or more actions as a graphical representation. In some embodiments, the system 102 may display the crowd information and the one or more actions on a map with location information etc. The system 102 may be configured to continually improve an accuracy and predictive capability of the system 102 by using machine learning.

In some embodiments, the system 102 may be accessed through a computing device like a smart phone or smart phone application and a cloud-based technology. The observed data is logged on the computing like the smart phone application and then fed into a centralized cloud database of the real-time measurement and management system 102, which represents the orientation stage. The smart phone app facilitates the input of density (D), flow (F) and mood (M) measurements by staff on the ground or through the data capturing devices 110A-110N at time intervals (may be denoted as t) as notified by the system 102. The system 102 is further configured to determine an absolute change in density, flow and mood measurements, and the speed of change of the density, flow and mood measurements, that is, change to density, flow and mood over time. The system 102 is configured to measure a change in density and flow and mood over time. More specifically, the real-time measurement and management system 102 focuses on the speed of increases in crowd density, and the speed of decreases in crowd flow and change in crowd mood. Rapid increases in crowd density and rapid decreases in crowd flow and mood may indicate impending congestion/crowd anxiety and crush scenarios.

The system 102 may not record or retain any facial features and personal information of the people in the crowds. Only the quantitative data of the people may be recorded and transmitted for analysis by the system. To be specific, no images are recorded, only the numbers of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive. The mood score may also be determined as a number. In some embodiments, the mood score may be configured into different categories and levels, wherein a category may comprise values like unknown, neutral, happy, sad, surprise, disgust, worried, fear, and anger, and a level may comprise values like low, medium, and high. The camera capturing this data will be installed in public places already under CCTV surveillance. In some embodiments, the system 102 is configured to distinguish between facial and head movements that are not related to a mood of an individual (or a plurality of people) of the crowd(s).

In some embodiments, the system 102 may be configured for quantitatively measuring and aggregating in real-time the sentiment or mood and movements of non-identified individual(s) within any group of persons or a crowd, using algorithmic methods and devices as discussed with reference to the FIG. 2 to analyze the captured data and to present actionable insights and recommendations to controllers or managers of an event, venue or precinct that will assist their management of an event, venue or precinct. The actionable insights and recommendations may include identification of hot spots and recommendations that managers (e.g. event managers) take physical measures to change the flow of movement of person(s) into or within an event, venue or precinct, or that managers direct human assistance to identified points of ingress, egress or and within the event, venue or precinct.

Figure 2:
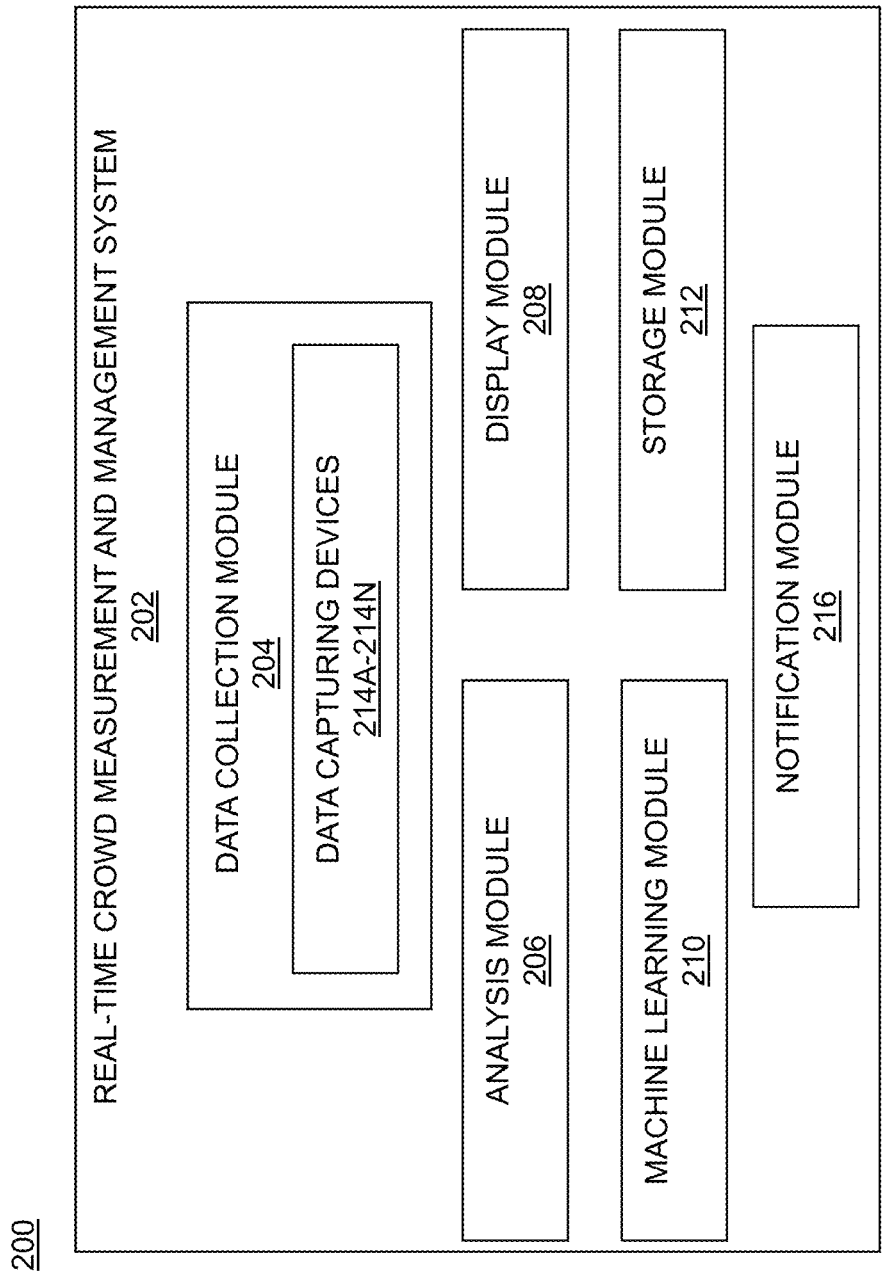
FIG. 2 is a block diagram illustrating various system elements of an exemplary real-time crowd measurement and management system, in accordance with an embodiment of the present disclosure.

FIG. 2 is a block diagram 200 illustrating various system elements of an exemplary real-time crowd measurement and management system 202, in accordance with an embodiment of the present disclosure. As shown, the real-time crowd measurement and management system 202 (hereinafter may also be referred as system 202) includes a data collection module 204, an analysis module 206, a display module 208, a machine learning module 210, a storage module 212, and a notification module 216. The data collection module 204 may further include a number of data capturing devices 214A-214N (hereinafter, the data capturing devices 214A-214N may collectively be referred as 214). The data capturing devices 214A-214N may include camera, CCTV, web cameras, video cameras, and so forth that are installed in locations where more people or crowd is expected like in concert halls, roads, etc.

The system 202 may allow time-critical decision making in uncertain and high-risk environments. The system 202 may define density, calculate crowd flow, and mood and may send alerts when crowd anxiety is increasing. Further, the system 202 may measure the speed of change in crowd density, flow and mod to indicate possible crowd congestion and crowd crush risks. Furthermore, the system 202 detects and matches the possible crowd congestion and crowd crush risks with appropriate crowd mitigation techniques and strategies. The system 202 may also be configured to detect and respond increases in risk with increase in awareness and attention. The system 202 is configured to learn and becomes more accurate and effective with greater use, time, and experience.

The data capturing devices 214 may be any suitable imaging device capable of taking images and/or processing the images. Examples of the data capturing devices may include cameras, webcams, closed circuit television (CCTV) cameras, video cameras, smart cameras, and so forth. The data capturing devices 214 is configured to may be installed in different zones or regions to continuously capture crowd data of a plurality of crowds in the plurality of zones. Each of the plurality of crowds may include a plurality of people. The data capturing devices 214 including the cameras can be programmed to provide automated responses with the application of artificial intelligence (AI) programs.

The data capturing devices 214 may include CCTV cameras and preserved vision may be held from many cameras in nearly all public places of mass gathering. In some embodiments, the data capturing devices 214 including the cameras may be programmed via Convolutional Neural Networks (CNN) to record density, flow and speed of the crowds. The convolutional neural networking allows the data capturing devices 214 including the cameras to scan crowds (See 106A-106N of FIG. 1) to collect large sets of data seamlessly, simply and almost anywhere.

The data capturing devices 214 are also configured to identify a plurality of crowd characteristics from the captured crowd data. The crowd characteristics may include at least one of a crowd density, a crowd flow, and a crowd mood. In some embodiments, the crowd characteristics comprising one or more quantitative crowd characteristics and one or more qualitative crowd characteristics. The one or more quantitative crowd characteristics may include a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive. The analysis module 206 may further be configured to measure the crowd characteristics by using artificial intelligence and convolutional neural networks (CNN). Further, the mood score may be configured, into different categories and levels, wherein a category may comprise values like unknown, neutral, happy, sad, surprise, disgust, worried, fear, and anger, and a level may comprise values like low, medium, and high like mildly happy, happy, very happy. The CNNs are mathematical models that may allow the capturing and learning of complex features in images (i.e. the captured crowd data) to understand scenes, and extract useful information in an autonomous manner. The CNN may be used for object detection for recognizing patterns such as edges (vertical/horizontal), shapes, colours, and textures in the crowd data. Further, the CNN may filter the crowd data, and transform the crowd data by using a specific pattern/feature. Further, the analysis module 206 may be configured to measure a speed of change in the crowd density, a trend and a rate of the trend in the crowd density, a flow and a mood of the plurality of crowds in the zones.

In some embodiments, the data collection module 204 is further configured to receive the crowd data from a plurality of observers present in the plurality of zones via a computing device and a network. As discussed with reference to the FIG. 1, the observers may include ground staff or officials manually providing crowd data to the system 102 via the computing device like mobile phone based on their observation of the crowds 106A-106N in the zones 104A-104N, respectively.

The data capturing devices 214 may not record or retain any facial features and/or personal information of the people in the crowds. Only the quantitative data of the people may be recorded and transmitted for analysis by the system 202. To be specific, no images are recorded, only the numbers of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive.

The analysis module 206 may analyze the captured crowd data to determine one or more patterns and changes in mood of the plurality of crowds. The analysis module 206 may also distinguish between facial and head movements that are not related to a mood of an individual of the crowd. In some embodiments, the analysis module 206 predicts the one or more patterns and changes in mood of the plurality of crowds based on predictive Bayesian network. The analysis module 206 may also analyze the crowd data by using any existing or future developed analysis methods. Further, the analysis module 206 may further predict crowd information including at least one of one or more emergent crowd characteristics, an emergent crowd behaviour of the plurality of crowds, and one or more issues based on the analysis in real-time. In some embodiments, the analysis module 206 indicates the one or more issues such as, but not limited to, possible crowd congestion and crowd crush risks based on the speed of change in the crowd density, crowd flow and crowd mood.

Further, the analysis module 206 may be further configured to analyze the crowd data to create a context for the analysis of crowd behaviour. The analysis module 206 may further be configured to examine and measure a relationship between two quantitative metrics and one qualitative assessment to increase predictability of crowd information comprising the crowd behaviour. The quantitative metrics or inputs are crowd density and flow measured as numbers, and qualitative assessment is crowd mood measured qualitatively that may be negative, neutral or positive.

The analysis module 206 may also suggest one or more actions for managing the plurality of crowds based on the crowd information. Examples of the one or more actions may include such as, but not limited to, installing more seats in an event area, stopping the crowd entry for couple of minutes, close the entry for the people, employ more security officials, and so forth. Further, the analysis module 206 may indicate the one or more issues such as, but not limited to, possible crowd congestion and crowd crush risks based on the speed of change in the crowd density, crowd flow and crowd mood.

The machine learning module 210 may continually improve an accuracy and predictive capability of the real-time crowd measurement and management system. In some embodiments, the machine learning module 210 is configured to continually improve an accuracy and predictive capability of the real-time crowd measurement and management system by using machine learning.

The storage module 212 may also store images, videos, predicted information, crowd quantitative characteristics, crowd data, crowd information, information about the zones, events, etc., analysis modeling algorithms/instructions, and so forth. The storage module 212 may also store pre-programmed alerts, pre-defined messages, actions, pre-defined limits for people, and information for determining crowd mood, flow, density and so forth.

In some embodiments, the real-time crowd measurement and management system 202 may be present in a cloud network. In alternative embodiments, the real-time crowd measurement and management system 202 is present in a network device like a server. In some other embodiments, the real-time crowd measurement and management system 202 is present in a computing device like a smart phone, laptop, computer, etc.

The display module 208 is configured to display the predicted crowd information along with at least one of an alert and at least one indicator in real-time. The display module 208 is further configured to display the one or more actions. In some embodiments, the predicted crowd information along with the alert, indicator, one or more actions, and so forth on a dashboard on a suitable output medium like a computing device, screen, and so forth. The predicted crowd information may include insights, reports, graphs, maps, etc. depicting predicted information about the crowd. In some embodiments, the insights may include real-time inferences as to likely future engagement, emotional satisfaction or other behaviour of groups of persons and locations where measurements of mood, flow, density or movement speed and direction create concern as to health, safety or well-being of any group of persons within or adjacent to an event, venue or precinct.

The system 202 (or the analysis module 206) may detect the rapid increase in density and decrease in flow and mood, it responds by producing alerts based on pre-set or pre-determined crowd levels. When these pre-set levels are reached, the alert or notification 'yellow flags' or 'red flags' an area where crowd congestion requires control and mitigation techniques. The storage module 212 provides a reference library, which matches the observation data to the most effective and appropriate control and mitigation technique.

The at least one indicator may include a colour indicator for denoting the crowd information comprising crowd feeling in real-time. Further, the display module 208 may show different colour indicators for presenting the crowd information about the crowds in different zones. In some embodiments, the display module 208 is further configured to display the crowd information and the one or more actions as a graphical representation. In alternative embodiments, the display module 208 is further configured to display the crowd information and the one or more actions as a map.

In some embodiments, the real-time crowd measurement and management system 202 may provide real-time crowd monitoring, fast risk assessment, and post event crowd insights. The notification module 216 is configured to send notification and programmed alerts to users of the real-time crowd measurement and management system 202. The notification module 216 may be a real time notification engine such as, but not limited to, Amazon Simple Notification Service (AWS SNS) or AppSync for providing notification to the users like decision makers, administration in real-time about crowd. In addition to the alerts, the notification module 216 or the system 202 may also respond by increasing the monitoring interval frequency (may be represented as "Δm"), that is, it increases the frequency of observation measurements being taken on the ground. In turn, as crowd density increases and crowd flow decreases, the system 202 notifies on ground staff or the decision makers to take observation measurements more frequently, drawing more specific and focused attention on potential crowd contestation and crowd crush areas. In this manner, the system 202 matches increasing levels of risk with increasing levels of awareness and attention.

The system 202 may create awareness and measure the risk via the absolute change, as well as the rate/speed of change, in the three selected characteristics. The system 202 may allow this to be performed in a highly efficient manner, thereby allowing crowd managers to increase their awareness of the situation and implement mitigation and control action places more quickly. The data gathered by the data collection module 204 may be stored in the storage module 212 and then used as a reference point for future events as well as to develop post-event workshops, redesigning of event sites, and response training. In this sense, the system 202 "learns" and becomes more accurate with greater use, time and experience.

It should be noted that as the system 202 has been designed for emergent crowd behaviour, its functioning and disclosed methods should not be understood as indicating mathematical certainty in the system 202. Instead, the system 202 provides information for decision making under conditions where information is limited by gathering a variety of observations together to provide the best approximation or available picture of the crowd situation. This picture of the crowd situation becomes clearer and more accurate with time as more incoming observations and information is inputted into the system 202.

Figure 3:
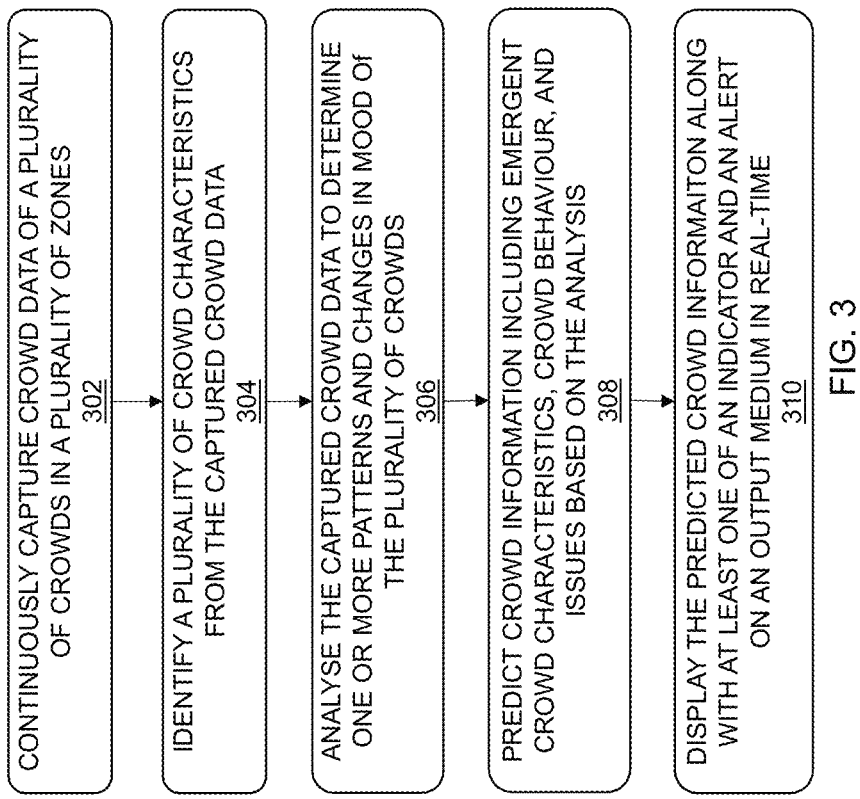
FIG. 3 is a flowchart diagram illustrating an exemplary method for measuring and managing a plurality of crowds, in accordance with another embodiment of the present disclosure.

FIG. 3 is a flowchart diagram illustrating an exemplary method 300 for measuring and managing a plurality of crowds, in accordance with an embodiment of the present disclosure. As discussed with reference to the FIG. 2, the real-time crowd measurement and management system 202 includes the data collection module 204, the analysis module 206, the display module 208, the machine learning module 210, and the storage module 212. The data collection module 204 may further include the data capturing devices 214A-214N (hereinafter, the data capturing devices 214A-214N may collectively be referred as 214).

The method 300 initiates at step 302. At step 302, the data capturing devices 214 continually captures crowd data of a plurality of crowds in a plurality of zones. As discussed with reference to the FIG. 1, the data capturing devices 214 may be installed in the different zones 104A-104N to capture the crowd data of the crowds 106A-106N, respectively. In some embodiments, the data collection module 204 receives the crowd data from a plurality of observers present in the plurality of zones 104A-104N via a computing device and a network.

At step 304, the analysis module 206 identifies a plurality of crowd characteristics from the captured crowd data. The analysis module 206 may also measure the plurality of crowd characteristics by using artificial intelligence and convolutional neural networks (CNN). In some embodiments, the analysis module 206 may also measure a speed of change in the crowd density, a trend and a rate of the trend in the crowd density, flow, and mood of the plurality of crowds in the zones 104A-104N. The CNNs are mathematical models that may allow the capturing and learning of complex features in images (i.e. the captured crowd data) to understand scenes, and extract useful information in an autonomous manner. The CNN may be used for object detection for recognizing patterns such as edges (vertical/horizontal), shapes, colours, and textures in the crowd data. Further, the CNN may filter the crowd data, and transform the crowd data by using a specific pattern/feature.

Then at step 306, the analysis module 206 analyses the captured crowd data to determine one or more patterns and changes in mood of the plurality of crowds 106A-106N. In some embodiments, the analysis module 206 analyses the captured crowd data to create a context for the analysis of crowd behaviour. Further, the analysis module 206 may examine and measure a relationship between two quantitative metrics and one qualitative assessment to increase predictability of crowd information comprising the crowd behaviour. The quantitative metrics or inputs are crowd density and flow measured as numbers, and qualitative assessment is crowd mood measured qualitatively that may be negative, neutral or positive. In some embodiments, the analysis module 206 determines and/or predicts the one or more patterns and changes in mood of the plurality of crowds 106A-106N based on predictive Bayesian network.

The system 202 is configured to determine a rapid increase in crowd density, that is indicative of a rapidly growing number of people within a specific area and possible crowd congestion or crowd crush scenario. Rapid increases in crowd density then may correspond with increased observation measurements via a higher monitor interval frequency.

The system 202 may detect crowd density, flow and mood and the complex interrelationships of these three characteristics, which can then be augmented with 3rd party datasets. This may enhance overall accuracy, expanding the ability to utilize leading edge technology and including other data sets in addition to density, flow and mood, e.g. weather, time of day, event type.

At step 308, the analysis module 206 predicts crowd information based on the analysis. The crowd information may include emergent crowd characteristics like crowd density, crowd flow, crowd mood, etc., crowd behaviour like positive, negative, or neutral, issues like congestions risks, etc., and one or more actions like deploy more security officials, stop entry of people for some time, etc. The analysis module 206 suggests or predicts one or more actions for managing the plurality of crowds 106A-106N based on the crowd information. Further, the analysis module 206 indicates the one or more issues such as, but not limited to, possible crowd congestion and crowd crush risks based on the speed of change in the crowd density, crowd flow and crowd mood.

At step 310, the display module 208 displays the predicted crowd information along with at least one of an indicator(s) and an alert(s) on an output medium like a screen or dashboard in real-time. The indicator may be a colour indicator for denoting the crowd information comprising crowd feeling in real-time.

The real-time measurement and management system 202 is configured to continually improve an accuracy and predictive capability by using machine learning. The system 202 may be configured to capture predominantly unstructured data (video) and machine learning algorithms to process it and extract knowledge and insights from it.

In some embodiments, the real-time measurement and management system 202 uses Amazon Web Services (AWS) cloud-based solution architecture and Security and can be deployed to suit your security requirements. In some embodiments, a suitable web browser like Apple Safari, Google Chrome, etc. accesses the real-time measurement and management system 202 as an application on a computing device like a computer, smart phone, tablet computer, laptop, and the like.

Figure 4:
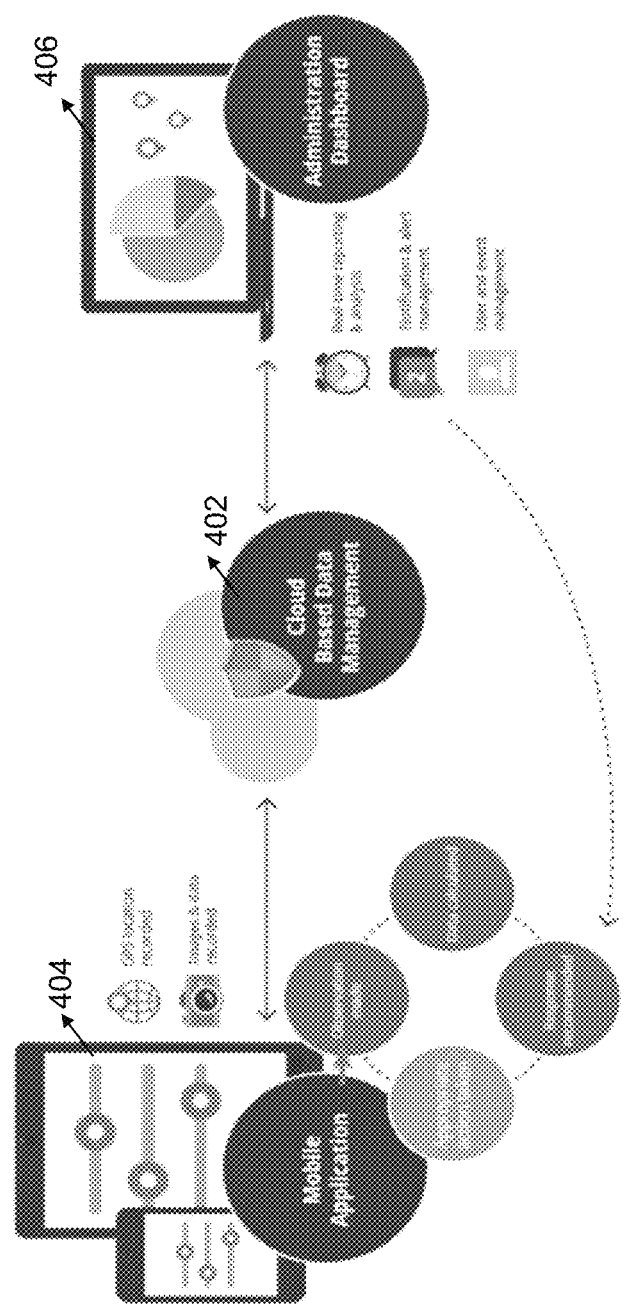
FIG. 4 illustrates another exemplary environment including a system for measuring and managing a plurality of crowds, in accordance with an embodiment of the present disclosure.

Turning now to FIG. 4, an environment 400 including a system 402 for measuring and managing a plurality of crowds is depicted, in accordance with another embodiment of the present disclosure. A user may access the real-time crowd measurement and management system 402 via a computing device or as a mobile application running on the computing device. As shown, the environment 400 may include a data collection module including a number of data capturing devices 404 like cameras, camera including GPS systems, smart phone, computers, video cameras, etc. The data capturing devices are configured to capture information such as record images, videos, GPS locations, crowd information, and so forth. The data capturing devices 404 may continuously observe and collect first set of crowd data including quantitative data and qualitative data of a plurality of crowds. Each of the plurality of crowds may include a plurality of people. The data collection module may also be configured to receive a second set of crowd data from a plurality of observers present at the plurality of zones via a computing device and a network.

By using artificial intelligence and convolutional neural networks (CNN), an analysis module present in the cloud-based data management system 402 may identify a plurality of crowd characteristics from the first set of crowd data and the second set of crowd data. The crowd characteristics may include such as, but not limited to, one or more quantitative crowd characteristics and one or more qualitative crowd characteristics. The crowd characteristics may include at least one of a crowd density, a crowd flow, and a crowd mood. Further, the one or more quantitative crowd characteristics may include a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive. The analysis module may measure the crowd characteristics by using artificial intelligence and convolutional neural networks (CNN) or any existing or future developed method. The analysis module may also measure a speed of change in the crowd density, a trend and a rate of the trend in the crowd density, flow and mood.

The captured information comprising the crowd data then may be sent to the system 402 that is shown to be a cloud-based management system 402. The analysis module of the system 402 may analyze the captured crowd data to determine one or more patterns and changes in mood of the plurality of crowds and create a context for the analysis of crowd behaviour and examine and measure a relationship between two quantitative crowd characteristics and one qualitative assessment to increase predictability of crowd information comprising behaviour.

The analysis module may determine the one or more patterns and changes in mood of the plurality of crowds based on predictive Bayesian network. The analysis module then may predict crowd information comprising at least one of one or more emergent crowd characteristics, an emergent crowd behaviour of the plurality of crowds, and one or more issues based on the analysis in real-time and suggest one or more actions for managing the plurality of crowds based on the crowd information. The analysis module may determine the one or more patterns and changes in mood of the plurality of crowds based on predictive Bayesian network or any other suitable method. The analysis module may indicate possible crowd congestion and crowd crush risks based on the speed of change in the crowd density, crowd flow and crowd mood.

The system 402 including a display module then displays the one or more actions and the predicted crowd information along with at least one of an alert and at least one indicator in real-time on an output medium 406 such as a dashboard (or administration dashboard). The at least one indicator may include a colour indicator for denoting the crowd information comprising crowd feeling in real-time. The crowd information and the one or more actions may be displayed at as a graphical representation, map, text, images, symbols, pie charts, colours, and so forth.

The system 402 includes a machine learning module configured to continually improve an accuracy and predictive capability of the real-time crowd measurement and management system. The real-time crowd measurement and management system 402 provides an effective approach to the measurement and management of emergent crowd behaviour.

The real-time crowd measurement and management system 402 allows for time critical decision making in uncertain and high-risk environments. Further, the real-time crowd measurement and management system 402 measures the speed of change in crowd density, flow and mood to indicate possible crowd. The real-time crowd measurement and management system 402 indicates congestion and crowd crush risks and detects and matches the possible crowd congestion and crowd crush risks with appropriate crowd. Further, the real-time crowd measurement and management system 402 may suggest mitigation techniques and strategies. Further, the real-time crowd measurement and management system 402 may detect and respond increases in risk with increases in awareness and attention. The real-time crowd measurement and management system 402 may be configured for real-time reporting and analysis and for user and event management.

Figure 5:
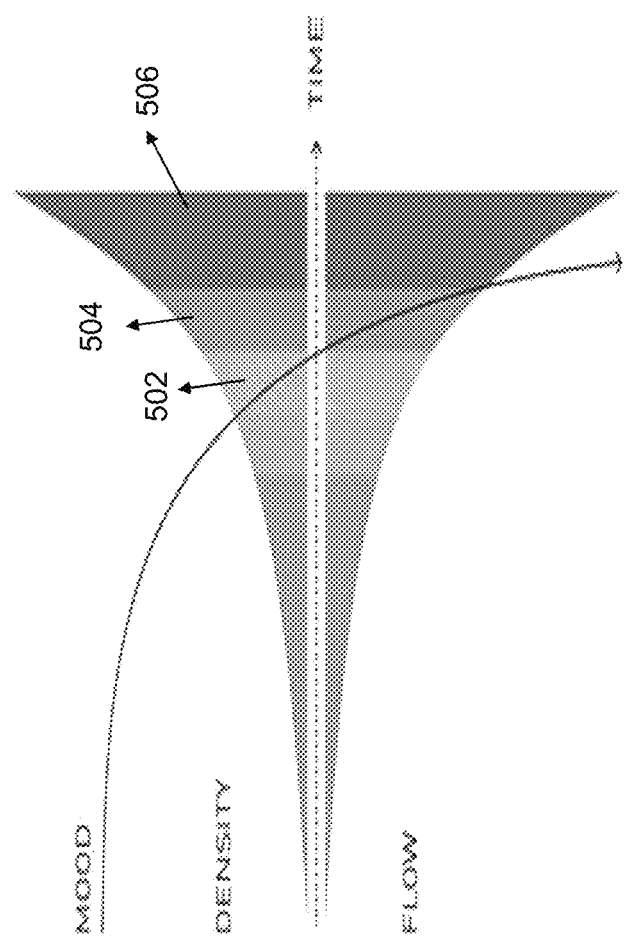
FIG. 5 illustrates an exemplary graph depicting an example of relationship between crowd density, crowd flow, and crowd mood, in accordance with an embodiment of the present disclosure.

FIG. 5 Illustrates an exemplary graph 500 depicting an example of relationship between crowd density, crowd flow, and crowd mood, in accordance with an embodiment of the present disclosure. As discussed with reference to FIG. 2, as density increases, the system 202 measures the corresponding decrease in flow. As density increases and flow decreases over time, crowd mood may begin to deteriorate as crowds become more anxious. A preventative action may be required at a colour zone 502, and at a colour zone 504 to prevent further deterioration of the crowd situation into a colour zone 506, which indicates high risk of crowd crush and congestion.

Further, the graph 500 is only a symbolic and exemplary representation of changes between crowd density, crowd flow, and crowd mood. A person ordinarily skilled in the art will understand that in real life a wide range of graphs, slopes and curves are independently achievable. For example, in an exemplary scenario, the crowds can be then to move to negative mood as crowd density increases to crush pressure but flow will not change. The graph 500 is just an exemplary representation of the relationships between flow, mood and density. Other representation, graphs, curves, and the like may also be possible and presence of this graph 500 in the description will not limit other representations.

Figure 6:
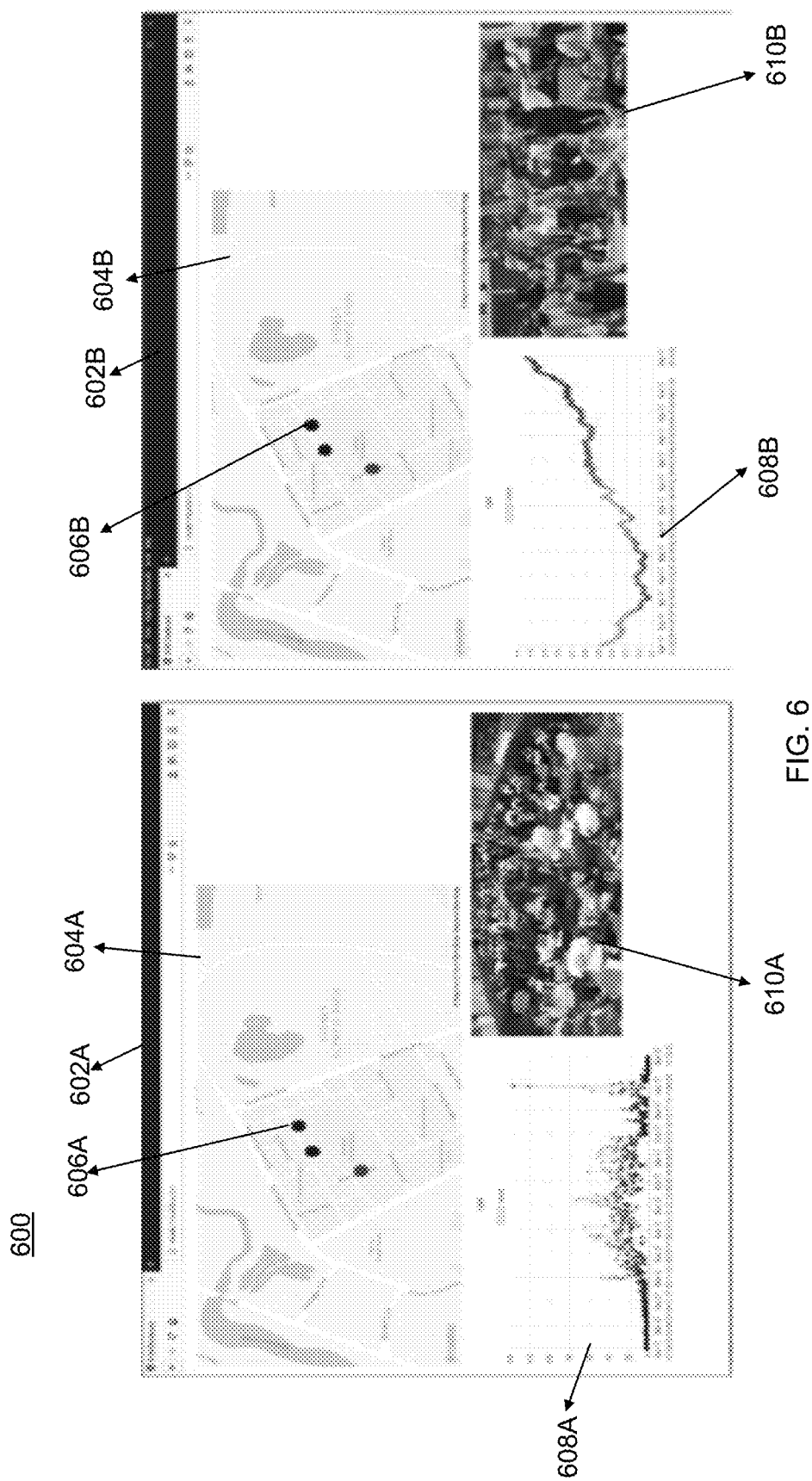
FIG. 6. Illustrates a display of predicted crowd information on a dashboard 600, in accordance with an embodiment of the present disclosure.

FIG. 6. Illustrates a display of predicted crowd information on a dashboard 600, in accordance with an embodiment of the present disclosure. As shown, the dashboard 600 shows a display 602A showing crowd information of zone 1 and a display 602B showing crowd information of zone 2.

The display 602A shows a map 604A with the location of the standalone cameras used to estimate crowd density. If a user clicks on an indicator 606A shown as a circle or dot on the map 604A, the user may observe a live plot of crowd number estimates 608A at the selected location and a live image 610A of that location.

Similarly, the display 602B shows a map 604B with the location of the standalone cameras used to estimate crowd density. If a user clicks on an indicator 606B shown as a circle or dot on the map 604B, the user may observe a live plot of crowd number estimates 608B at the selected location and a live image 610B of that location.

In some embodiments, a live video or feed from the selected location (or zones) may also be displayed on the display 602A-602B of the dashboard 600.

The disclosed real-time crowd measurement and management system provides a complete picture to Crowd Management Decision Makers enabling them to take early preventative action that enhances the crowd experience or avoids incidents. The system is based on real-time, accurate and reliable crowd data instead of reacting to subjective gut feelings of individuals that are often made under very stressful conditions. The system may be used by place managers who want to use crowd mood as a metric for place management. The system may be used by event managers and operators, precinct and transport authorities, law enforcers, smart city planners and architects for crowd management decision-making & workflow automation.

The disclosed real-time crowd measurement and management system is configured to capture crowd data and measure crowd density, crowd flow and crowd mood. The system may use data science to model these characteristics into fitness landscapes. The system then may apply machine learning to predict when the mood of a crowd would turn negative. CNN may be used for person recognition, person count, and density in a crowd. The system may use Bayesian joint probability distribution weighted models for visual mood extraction supplemented by environmental and other factors. The system may be configured for crowd noise monitoring, facial temperatures monitoring, social media scraping key word searches, and so forth. The disclosed system includes multiple camera (existing or supplied) to capture crowd data by observing an activity of crowd etc. at strategic locations. The system may use CNN to identify crowd characteristics. The system is configured to analyze the crowd data based on predictive Bayesian network to predict patterns and changes. The system may provide a dashboard to display insights on crowd behaviour. The system may use predictive capability to continually improve by machine learning module. In some embodiments, the system may use the cameras to automatically capture, identify, and analyze data. Further, the system may efficiently predict the crowd behaviour and potential risks and safety issues with more accuracy.

In some embodiments, the real-time crowd measurement and management system may be an edge-based, close-loop, offline and centralized setup that completely cut off from internet. Alternatively, the system may be a cloud based distributed setup with data processing and gathering in the cloud with secure data transmission media like VPN, HTTPS, webSocket, etc.

The disclosed real-time crowd measurement and management system (hereinafter may be referred as system) and method may provide organizations with a more effective and responsive methodology for the measurement of key crowd metrics in real-time, allowing for more effective planning and decision-making in crowd management. The system may measure important characteristics and metrics of emergent crowd behaviour.

In some embodiments, ethics approval will be sought before data capture by the real-time crowd measurement and management system. The system may not record or retain any facial features and/or personal information of the people in the crowds. Only the quantitative data of the people may be recorded and transmitted for analysis by the system. To be specific, no images are recorded, only the numbers of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive. The mood score may be determined as a number. The camera capturing this data will be installed in public places already under CCTV surveillance. In some embodiments, the mood score may be further configured into different categories and levels, wherein a category may comprise values like unknown, neutral, happy, sad, surprise, disgust, worried, fear, and anger, and a level may comprise values like low, medium, and high like mildly happy, happy, very happy.

In an example, up to 6 stand-alone camera/computer pods can be deployed to collect and analyze data at any other location. The system uses intelligent camera technology using Convolutional Neural Networks (CNN)' to observe crowd characteristics and measures quantitative and qualitative data. The system may collect information on crowd density, flow and mood of the crowds. The system may identify and anticipate human/crowd behaviour using the data collected. The results are visualized on a dashboard in real-time by using Green, yellow, orange and red indicators for each camera zone denote crowd feeling. The system may include a notification module to send programmed alerts to help to keep decision makers informed, allowing crowd calming actions or changes in design to be implemented that ensure customer satisfaction and event success. The system may use machine learning and artificial intelligence to improves characterization and analysis.

The disclosed system generates one or more reports based on the analysis of crowd data for post-event analysis. The system may enable improved crowd decision making in the real-time using either a combination of latest generation cameras with existing infrastructure or a best of breed change-out to new infrastructure. In some embodiments, strategic upgrade of infrastructure in key locations may enable improved quality, additional customer experience insights and analytics. This system may also enhance an existing CCTV system.

The system can provide crowd measurement data that accounts for emergent crowd behaviour, that is, the diverse and complex range of factors present in modern events, particularly in relation to fluctuations and differences in crowd behaviour within event sites and congestion points in mass gatherings. The system enables organizations to prepare and plan crowd management strategies and respond quickly to emerging threats. The system may allow for allow for earlier detection and awareness of possible crowd risks, as well as matching increases in the level of risk with increased awareness and attention, and responding with effective and tested mitigation strategies.

The disclosed system may enable users of the system to configure devices to their specific needs, configure the dashboard (i.e. the display on the output medium) to their requirements, access several standard reports for post-event analysis, generate custom reports accurate to an event, utilize system consulting to discover critical insights in their data crucial to future planning and event execution (included), benchmark their results against similar incidents, and develop training programs for guards and crowd managers. The users may be event organizers, administration staff, decision makers, crowd managing authorities, and so forth.

The disclosed real-time crowd measurement and management system may provide a stronger basis for crowd decision making, automates workflows for productivity improvement and provides analytics for planning and risk management. The system captures rich crowd Meta-Data from cameras and other devices (edge technology), processes this data (locally on and near the edge device and remotely in the cloud) and then presents it to users via browser-based application or system.

The disclosed system may be configured to accurately measure crowd densities, flows at bottlenecks, and identification of crowd pulses. The system may also provide a framework to implement crowd calming actions. Identified areas for potential re design and crowd diversion.

The disclosed system may enable improved crowd decision making in real-time using existing infrastructure. Hence, low deployment costs versus immediate upgrade of infrastructure. It provides simple onboarding and start the journey to improved productivity and move to an upgrade path based on budget setting & timing needs.

The disclosed system may help administration or decision makers to decide when do pedestrians become a crowd and when does that crowd need crowd management response, by focusing on the speed of change in crowd density, flow and mood as indicators of potential crowd congestion and crowd crush. The disclosed real-time crowd measurement and management system may be configured for factual quantitative measurement to inform effective crowd management responses for state and local government, law enforcement and private sector owners/operators of events and major venues. The disclosed system is configured for rapidly identifying potential issues and indicate the need for action to prevent escalation to the point of heightened or likely risk of injury.

The disclosed systems and methods may assist stakeholders or one or more decision makers in time critical decision making in an uncertain and high-risk environment, and when faced with limited information. It is intended that the quantitative results can prompt quicker pre planned response better than subjective qualitative description methods and be statistically more consistent. The real-time crowd measurement and management system is designed to allow for earlier detection and awareness of possible crowd risks, as well as matching increases in the level of risk with increased awareness and attention, and responding with effective and tested mitigation strategies.

The disclosed systems and methods take advantage of machine efficiency by utilizing a number of cameras to automatically capture, identify and analyze data. This may eliminate inaccuracies and inefficiencies apparent with traditional methods requiring on-ground practitioners. eliminates inaccuracies in the analysis of crowds.

The disclosed system may result in good crowd management to maintain a crowd in a neutral or positive mood.

The disclosed systems and methods may analyze the emergent behaviour of crowds in public spaces transport hubs and events. The system is configured to look at the crowd data including computer images and identify people and calculate density flow and mood with a variety of methods. The systems may use modeling techniques to identify underlying patterns to predict when crowd mood may fall without requiring any human review.

The disclosed systems and methods may also remove inefficiencies in the collection process and the problem of data context. The system may analyze huge datasets collected by the data collection module to create a context for the analysis of crowd behaviour. The machine learning module may continually refine and improve the accuracy of creating the context and predicting the emergent crowd behaviour.

The disclosed systems and methods may examine and measure the relationship between two quantitative metrics and one qualitative assessment to increase predictability of crowd behaviour. The quantitative metrics or inputs may be crowd density and flow measured as numbers, and qualitative assessment may be crowd mood measured qualitatively that may be negative, neutral or positive.

The disclosed systems and methods may enable decision makers, event organizers etc. for time critical decision making in uncertain and high-risk environments. The systems and methods may provide an effective approach to the measurement and management of emergent crowd behaviour.

The disclosed systems and methods measures the speed of change in crowd density, flow and mood to indicate possible crowd congestion and crowd crush risks. Further, the system may detect and match the possible crowd congestion and crowd crush risks with appropriate crowd mitigation techniques and strategies. The systems and methods may detect and respond to increase in risk with increase in awareness and attention.

The disclosed system is configured to learn and become more accurate and effective automatically with greater use, time and experience. The disclosed system may use machine learning to learn and become more accurate and effective with greater use, time and experience.

The disclosed real-time crowd measurement and management system may leverage real-time, data driven intelligence on crowd that may in turn facilitate transformation of customer experience, better crowd management and crowd mitigation, increased crowd safety and improved planning input for planning infrastructure, resources, safety.

The disclosed real-time crowd measurement and management system may be used in smart cities and public precincts for real time adjustments and management of critical infrastructure (transport, traffic lights) and allocation of resources such as, but not limited to, police and securing officials, and the like for crowd management. Further, disclosed real-time crowd measurement and management system may provide insights into crowd safety and critical infrastructure planning (placement, timing and effectiveness) and may help in development of public spaces.

The real-time crowd measurement and management system and method can provide crowd measurement data that accounts for emergent crowd behaviour including the diverse and complex range of factors present in modern events, particularly in relation to fluctuations and differences in crowd behaviour within event sites and congestion points in mass gatherings. The organizations may prepare and plan crowd management strategies and respond quickly to emerging threats based on the predicted emergent crowd behaviour and potential crowd safety/congestion issues.

The disclosed system is an autonomous system comprising a data collection device to accurately measure crowd data based on crowd characteristics including crowd density, flow, and mood. The data collection device may include multiple imaging devices. The system includes an analyzing module for analyzing the crowd data. The system includes an analysis module. Based on the analysis of the crowd data and by monitoring the feeds from the multiple imaging devices, the analysis module may predict crowd behaviour and potential crowd safety and congestion issues for informed decision making.

In some embodiments, the disclosed system may be used in a train station or in a control room of a train station to manage crowd and monitor the crowd. Moreover, the system can be used in any public space for monitoring and managing crowds. The system can also be used to monitor and manage a flow and mood of the crowd without actual facial recognition or any personal characteristics recognition of individuals in the crowd. Further, the system may be configured not to capture and/or store any personal characteristics like face, height, colour, and image of the individuals present in the crowd.

Further, the system may distinguish between facial and head movements that are not related to a mood of an individual. For example, if a person is leaning forward to search something on the floor may not be interpreted a sad or disappointment mood of the individual.

The disclosed systems and methods may be used by decision makers for developing and planning successful and safe events. The real-time crowd measurement and management system may measure crowd and provide predictions about behaviour of crowd, this prediction information may be used by the decision makers for efficient and effective real-time deployment of staff and resources like security etc. This may result in overall improvement of user (like individuals in the crowd) experience and event productivity & compliance.

The disclosed system may use visual imaging technology to create data sets large enough to use landscape fitness graphing that may enable predictive real-time crowd management assessments.

The disclosed system may use artificial intelligence (AI), object recognition, machine learning, and CNN for accurate, non-biased identification and measurement of crowd characteristics and to improve characterization and analysis, hence removing human bias from the crowd decision making process. The CNNs are mathematical models that may allow the capturing and learning of complex features in images (i.e. the captured crowd data) to understand scenes, and extract useful information in an autonomous manner. The CNN may allow the data collection device comprising cameras to identify large sets of data seamlessly, simply, and almost anywhere. This way, the crowds can be estimated automatically and at a high rate. In some embodiments, the data collection device comprising one or more cameras may be programmed via CNN to record density flow and speed. Further, the machine learning technics may be used for behaviour and object recognition.

The disclosed system may estimate crowds automatically and at a high rate. The system is configured for quantitative analysis of crowd management and defining and modeling crowd mood.

The disclosed system and method may be used in transport hubs improvement of safety management and compliance (active monitoring of movement and occupancy levels). Further, the system and method may provide non-biased and accurate insights for informed decision making on critical transport infrastructure.

The disclosed system and method may understand crowd behaviour and measure crowd satisfaction or anxiety.

The disclosed system and method may measure mood changes in crowds and predict emergent behaviour of the crowd. The predicted emergent behaviour may be used for safe management of the crowd and for future design input. Further, the predicted emergent behaviour may be used as an input for designing public places, transport hubs, and smart cities and developing new real-time methods for crowd mitigation and management.

The disclosed system is configured to display programmed alerts via the display module on an output medium like a computer screen. The alerts may help to keep decision makers informed, allowing crowd calming actions or changes in design to be implemented that may ensure customer (for example, people of the crowd) satisfaction and event success.

In some embodiments, post data collection and analysis, the prediction and risk assessment can be done by using, but not limited to, machine learning and artificial intelligent algorithm/method like Bayesian network, Recurrent neural network, CNN, decision tree, mapping tables etc.

The disclosed system may provide crowd and customer analytics with privacy and security by design and default. A system is a real-time information and insights solution that captures and analyses the flow, density, distribution and engagement, without facial recognition or affect recognition. Usually, audience size, movement and engagement at live events is difficult to capture and reliably measure. The system may enable a user of the system to capture granular data on audience size, movement and engagement pre and post event. Without the system, a wealth of critical information is never reliably captured. The system includes a dashboard that may provide unprecedented, conveniently presented, real time insights into flow, density, distribution and engagement of crowds and customers.

The disclosed real-time crowd measurement and management system may allow cloud providers such as, but not limited to, AWS, Azure, and Google Cloud to deliver unparalleled experiences for prospects and customers, without unfair surveillance of interfering with each individual's privacy.

The disclosed system provides a dashboard displaying data and real time insights with associated video feeds to the user. Further, the system has ability to leverage any HD to 4K camera feed. Furthermore, the system is compliant with requirements of regulated data privacy jurisdictions—i.e. EU GDPR, CCPA (California), Singapore POPA and Australian Privacy Act.

The system may be a SaaS solution that is simple and cost effective to deploy and maintain the system. The system will work with any cameras that can provide a live IP protocol feed: the rest is handled by the platform.

The system may determine and provide insights such as, but not limited to, a correlation between flow/congestion and leads scanned on booth; customer habits during breakout and keynote presentations; customer habits on the expo floor; which content best engages which audience; ways to optimize expo floor plan; and customer attrition over the course of a day.

In some embodiments, the data captured by the system may be stored on a cloud-based server and storage such as, AWS servers and storage that may be managed by the provider of the system. In some embodiments, the data may be captured as follows: audience sentiment inference, density, direction/flow of crowd through an area; camera pose, location configuration; timestamp analytics; deployment information. The system is configured not to capture and store the following data: facial information, facial ID/recognition; personal information about any reasonably identifiable individual.

The system may leverage crowd data and/or audience data (i.e. the insights etc.) to further improve system's current artificial intelligence and computer vision models; and to further develop the attention model.

In some embodiments, software technologies comprising such as, but not limited to, AWS: Route53, VPC, Subnets, Internet Gateway, NAT Gateway, ELB for infrastructure setup may be used. Similarly, for developing frontend of the disclosed system, software technologies comprising such as, but not limited to, AWS: ACM (AWS Certificate Manager), CloudFront, S3, Non-AWS: AuthO, Surge CDN (testing environment) may be used. Furthermore, for developing back end of the system, software technologies comprising such as, but not limited to, AWS: API Gateway, ECS, EC2, Lambda, RDS, DynamoDB, S3, CloudWatch, Non-AWS: Apache Kafka, Docker may be used.

The disclosed system may analyze and derive insights from data captured; share with a team such as crowd management team, marketing team for future event planning efforts; provide real-time response to situations on the floor, realize and capture moments of excitement; provide quantifiable metrics to prove value of sponsorship; and provide relevant data to the stakeholders so as to optimize and improve the customer experience ahead of an event like a summit, concert etc.

The disclosed system may be used for aggression detection for the crowd during sports matches as well as three more gradient levels of happiness in the positive sphere may be measured.

The disclosed systems and methods may be used for measuring mood of the crowd and density around certain attractions. The systems may be used for observing people and measuring their mood. One skilled in the art will appreciate that the disclosed systems and methods may be used in various situations and environments for capturing, observation, and analysis of data about people to derive one or more insights and conclusions.

In some embodiments, a real-time crowd measurement and management system includes a data collection system or data capturing devices for collecting data based on crowd metrics comprising at least one of crowd density, crowd flow, and crowd mood. In some embodiments, the data collection system may collect input data using different remote (and/or non-contact) sensing technologies. In some embodiments, the data collection system is based on real-time observations by ground staff instead of estimations and calculations, hence providing a method that is highly responsive and adaptable. This method allows crowd controllers to collect data at gatherings then use the agreed trigger points to implement crowd management techniques to reduce crowd congestion to the desired target levels. The system may use machine efficiency to collect data and artificial intelligence to track mood changes through the relationship of crowd flow speeds and increasing crowd densities.

In an exemplary scenario, the real-time crowd measurement and management system takes video stream of images, typically sourced from closed circuit television (CCTV) cameras, of crowds in public places or semi-public places such as transport hubs, entertainment and sports venues, and runs analytics over human movements within those images, to provide insights to crowd managers in control centres as to crowd density, flow and mood. These insights may enable crowd managers in control centres to identify potential problems in movements of people and take appropriate remedial action.

A typical application of the real-time crowd measurement and management system is to supplement observation of video streams from CCTV cameras as now typically streamed to a crowd management centre and projected onto multiple screens at a crowd management centre (CMC) for manual human observation. The real-time crowd measurement and management system takes those video streams as a digital input stream, analyses that digital data to infer trends in movement of humans observed within that crowd, and presents insights from those analytics as a convenient dashboard or other visualization for managers working within the crowd management centre. This typical application of the system leverages already established crowd management technical infrastructure, being: CCTV cameras, digital video streams from those CCTV cameras as presented to a crowd management centre, information processing technologies and capabilities at a crowd management centre, and properly trained and experienced crowd management personnel working at that centre and using various data inputs available to assist them in making decisions about crowd management. Using the system may reduce the complexity and volume of those data inputs and thereby may reduce the risk of human fatigue, subjectivity and bias, error and overload, in the course of observation and interpretation by crowd managers of information presented them.

Another typical application of the system may be in a crowd management centre overseeing movements of people around a sports stadium. The CMC personnel may direct additional personnel to supervise queuing at ticket sales kiosks or food outlets, or to erect temporary barriers at particular ingress or egress points to manage movements of people down to safe levels. This can be largely done through density and flow analysis. The system may dynamically assess stress levels of crowds by observation and analysis of whether more individuals are looking up or down, or exhibiting rapid head movements, and estimation the delta between that point of observation and previous points of observation. This mood analysis cannot readily be done through human visual observation alone, given complexity of information that needs to be human processed and subjectivity in human analysis. In some embodiments, the system supplements, but may not supplant or fully replace, observation and interpretation by crowd managers of information presented them. Rather, the system may reduce the quality of information that a human crowd manager needs to interpret, and presents that information in much more readily interpretable form.

In some embodiments, the system may not require, use or support live facial recognition. The same digital video streams from CCTV cameras as presented to a crowd management centre might be used as an input to facial recognition systems, real-time or after the event, but such systems may be entirely separate from implementation of the system. The system neither supports nor utilizes facial recognition, real-time (live, or LFR) or after the event.

Further in some embodiments, the system may not require or use non real-time video streams. Indeed, as the system is only designed to provide real-time insights for immediately actionable decisions by crowd management personnel as to management of crowd density and flow, the system may not require or use delayed video streams. It may be that particular crowd management centres wish to retain archival records of video streams for law enforcement, training or other purposes. These decisions can be made by particular crowd management centres having regard to regulatory requirements and impact assessments under regulatory schemes such as, but not limited to, the UK Home Office Surveillance Camera Code of Practice (June 2013).2. The system may not require a change to any such practices. Retention of archival video streams may not be required to support operation of the system by any crowd management centre.

In some embodiments, the system may be provided as a cloud platform based, application as a service solution. A secure VPN connection may be required from the client's system to the client-specific instance of the system stream to the instance of the system on the cloud as stood up for that client. The system may be provided and supported from instances stood up on local or regional clouds, such as the AWS EU-only cloud, the AWS Australia-only cloud, and so on. The digital video stream from the crowd management centre is ingested into the system on that cloud, analyzed and the insights and data outputs presented back to the crowd management centre. The digital video stream from the crowd management centre may not require to be archived or otherwise retained within or for the system. The system as an application as a service, may provide a delete cycle for the digital video stream in accordance with requirement of a client using the system, including (if so required) deletion immediately after analysis.

In some embodiments, an owner or provider of the system may be pursuant to contractual commitments as to data privacy controls and safeguards which may include: no use of facial recognition or other techniques to identify individuals that are observed within a crowd; no retention of digital video streams beyond the delete cycle as agreed with the client; no movement of digital data provided by the client in the course of use of the service outside of the instance of the DCM solution as stood up for that client on a particular (contractually specified) local or regional cloud; compliance by Dynamic Crowd Measurement Pty Limited as provider of the DCM solution with all relevant laws, including data privacy laws.

As noted above, identification of individuals present within crowds is neither required by the system, nor a feature of, or enabled by, the system. In some embodiments, the clients proposing to implement the system will need to consider the operation of relevant regulations in their jurisdiction. Often clients will have already assessed compliance of existing crowd management technical infrastructure, and these assessments can be leveraged, and supplemented if necessary, to address addition of the system. For example, in the United Kingdom many existing CCTV systems and crowd management systems will have been data privacy impact assessed under existing regulatory schemes, such as the UK Home Office Surveillance Camera Code of Practice (June 2013). Assessment of implementation of the system can be made within the context of that existing impact assessment.

In some embodiments, the crowd may include a plurality of persons. Non-limiting examples of the crowd may include one or more people seated in a restaurant, a largely sedentary group of people, or an ordered progression of people (i.e. a queue, or people sitting at poker machines).

An embodiment of the present disclosure provides a system and a method for real-time management of activities of one or more persons or any group of persons using aggregated quantitative measures of their activities, engagement and emotional satisfaction.

In some embodiments, the present disclosure provides systems and methods for quantitatively measuring and aggregating in real-time the sentiment or mood and movements of non-identified individual(s) within any group of persons or a crowd, using algorithmic methods and devices as discussed above in the FIG. 2 to analyze that data (i.e. the collected or captured data) and to present actionable insights and recommendations to controllers or managers of an event, venue or precinct that will assist their management of an event, venue or precinct. The actionable insights and recommendations may include identification of hot spots and recommendations that managers (e.g. event managers) take physical measures to change the flow of movement of person(s) into or within an event, venue or precinct, or that managers direct human assistance to identified points of ingress, egress or and within the event, venue or precinct.

The disclosed systems may collect input data (i.e. the crowd data or data about an individual) using different remote (non-contact) sensing technologies.

In some embodiments, the insights provided by the systems and methods may include real-time inferences as to likely future engagement, emotional satisfaction or other behaviour of groups of persons and locations where measurements of mood, flow, density or movement speed and direction create concern as to health, safety or well-being of any group of persons within or adjacent to an event, venue or precinct.

The present disclosure also provides a real-time crowd measurement and management system (may also be referred as a real-time crowd management and engagement system) configured to perform privacy protected sentiment analysis by using non-invasive technics to measure customer satisfaction. The system includes data capturing devices i.e. the cameras to capture (or observe) and analyze crowd mood in specific locations and times to understand and graphically and numerically depict crowd mood. This may be useful for marketing companies that may want to gather data on what customers like or what interests them in a more accurate way than survey questionnaires. The real-time crowd measurement and management system may process crowd data and determine customer/crowd analytics with privacy and security. The real-time crowd measurement and management system may be a real-time information and insights solution that captures and analyses the flow, density, distribution and engagement, without facial recognition or affect recognition. Audience size, movement and engagement at live events is difficult to capture and reliably measure. The real-time crowd measurement and management system may enable capture of granular data on audience size, movement and engagement pre and post event. The real-time crowd measurement and management system may display information of a dashboard. The dashboard may provide unprecedented, conveniently presented, real time insights into flow, density, distribution and engagement of crowds and customers. The dashboard may display data and real time insights with associated video feeds. The real-time crowd measurement and management system is configured to leverage any HD to 4K camera feed.

The disclosed real-time crowd measurement and management system may deliver unparalleled experiences for prospects and customers, without unfair surveillance of interfering with each individual's privacy.

The disclosed real-time crowd measurement and management system is compliant with requirements of regulated data privacy jurisdictions—i.e. EU GDPR, CCPA (California), Singapore POPA and Australian Privacy Act.

The real-time crowd measurement and management system may be provided as a SaaS solution that is simple and cost effective to deploy and maintain. The real-time crowd sentiment analysis system may work with any type of cameras that can provide a live IP protocol feed.

In an exemplary scenario, the real-time crowd measurement and management system implementation may require site visit to determine camera placement; working with venue to attain additional camera inputs from existing venue cameras; system & camera deployment & testing; consent for deployment at the Summit (AWS); updated Summit Privacy Policy; and on-site deployment may include approximately 2 hour software setup followed by approximately 45 min camera calibration per camera.

The disclosed real-time crowd measurement and management system is configured to determine and present information such as, but not limited to, a correlation between flow/congestion and leads scanned on booth; customer habits during breakout and keynote presentations; customer habits on the expo (or event) floor; which content best engages which audience; ways to optimize expo floor plan; and customer attrition over the course of a day. The real-time crowd measurement and management system may store this information or other data on a cloud-based storage device such as, but not limited to, AWS servers. The information or the data may be cleansed and labeled for easy access and training purposes.

In some embodiments, the real-time crowd measurement and management system may capture the data comprising such as, but not limited to, Audience sentiment inference, density, direction/flow of crowd through an area; Camera pose, location configuration; Timestamp analytics; Deployment information. Further, the real-time crowd measurement and management system may not capture and store facial information, and personal information about any reasonably identifiable individual. The real-time crowd measurement and management system is configured not to recognize any facial information or facial ID. Further, the real-time crowd measurement and management system may enable a user to see privacy and security settings as per user's requirements. Further, the real-time crowd measurement and management system may enable the user to define access permissions for data through the dashboard of the system.

In some embodiments, the real-time crowd measurement and management system may analyze and derive insights from data captured and share the data and/or insights with other users and teams for future event planning efforts. Further, the real-time crowd measurement and management system may provide real-time response to situations on the floor, realize and capture moments of excitement and may provide quantifiable metrics to prove value of sponsorship. Further the real-time crowd measurement and management system may provide relevant data to optimize and improve the summit (or any other event) customer experience ahead of summit.

In some embodiments, technologies used for implementing the real-time crowd management (or sentiment analysis) system may include: At front end: AWS: ACM (AWS Certificate Manager), Cloud-front, Route53, S3 Non-AWS: AuthO, Surge CDN (testing env); and at back end: API server and backend supporting services; AWS: ECS (Elastic compute service), EC2, RDS (PostgreSQL), S3, CloudWatch, VPC, load balancer.

In some embodiments, the real-time crowd measurement and management system is configured to read expressions, count smiles, frowns, and other features of individuals in a crowd to provide privacy protected sentiment score. The sentiment score may help a user to know how an audience (i.e. the crowd) perceives an event, a product, a stand, a presentation etc. The system may help the user to develop opinions based on data and advanced analytics.

The real-time crowd measurement and management system may be an artificial intelligence powered crowd analytics system configured to accurately measure crowd sentiment in multiple zones simultaneously and provides essential insight into crowd feelings. Further, the system is configured to learn based on the past insights and data to improve and hence overall accuracy may increase with high-speed repetitive analysis and big data analysis.

In some embodiments, the real-time crowd measurement and management system may be used to survey individuals of the crowd by using advanced data analytics and AI.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

What is claimed is:

1. A real-time crowd measurement and management system comprising:
    a data collection module comprising a plurality of data capturing devices installed in a plurality of zones, respectively, the plurality of data capturing devices are configured to continuously capture crowd data of a plurality of crowds in the plurality of zones, wherein each of the plurality of crowds comprising a plurality of people;
    an analysis module configured to:
        identify a plurality of crowd characteristics from the captured crowd data, wherein the crowd characteristics comprising at least one of a crowd density, a crowd flow, and a crowd mood;
        analyse the captured crowd data to determine one or more patterns and changes in mood of the plurality of crowds; and
        predict crowd information comprising at least one of one or more emergent crowd characteristics, an emergent crowd behaviour of the plurality of crowds, and one or more issues based on the analysis in real-time; and
        suggest one or more actions for managing the plurality of crowds based on the crowd information; and
    a display module configured to display the predicted crowd information along with at least one of an alert and at least one indicator in real-time, wherein the crowd characteristics comprising one or more quantitative crowd characteristics and one or more qualitative crowd characteristics, wherein the one or more quantitative crowd characteristics comprises a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive, further wherein the mood score comprises categories comprising unknown, neutral, happy, sad, surprise, disgust, worried, fear, anger and a level comprising low, medium, high.

2. The real-time crowd measurement and management system of claim 1, wherein the analysis module is further configured to:
    analyse the crowd data to create a context for the analysis of crowd behaviour; and
    examine and measure a relationship between two quantitative metrics and one qualitative assessment to increase predictability of crowd information comprising the crowd behaviour.

3. The real-time crowd measurement and management system of claim 2, wherein the display module is further configured to:
    display the one or more actions; and
    display at least one of the crowd information, the one or more actions and the one or more suggestions as a graphical representation.

4. The real-time crowd measurement and management system of claim 2, wherein the analysis module is further configured to:
    predict the one or more patterns and changes in mood of the plurality of crowds based on predictive Bayesian network;
    measure the crowd characteristics by using artificial intelligence and convolutional neural networks (CNN);
    measure a speed of change in the crowd density, flow and mood of the plurality of crowds in the zones, a trend and a rate of the trend in the crowd density, flow and mood; and
    indicate the one or more issues comprising possible crowd congestion and crowd crush risks based on the speed of change in the crowd density, crowd flow and crowd mood.

5. The real-time crowd measurement and management system of claim 1, wherein the data collection module is further configured to receive the crowd data from a plurality of observers present in the plurality of zones via a computing device and a network.

6. The real-time crowd measurement and management system of claim 1 further comprising a machine learning module configured to continually improve an accuracy and predictive capability of the real-time crowd measurement and management system.

7. The real-time crowd measurement and management system of claim 1 is present in a cloud network.

8. The real-time crowd measurement and management system of claim 1, wherein the data capturing devices are configured not to record any facial features and personal information of the plurality of people in the plurality of crowds.

9. A method for measuring and managing crowd in real-time, the method comprising:
    continuously capturing, by a plurality of data capturing devices of a data collection module, crowd data of a plurality of crowds present in a plurality of zones, wherein each of the plurality of crowds comprising a plurality of people;

identifying, by an analysis module, a plurality of crowd characteristics from the captured crowd data, wherein the crowd characteristics comprising at least one of a crowd density, a crowd flow, and a crowd mood;

analysing, by the analysis module, the captured crowd data to determine one or more patterns and changes in mood of the plurality of crowds;

predicting, by the analysis module, crowd information comprising at least one of one or more emergent crowd characteristics, an emergent crowd behaviour of the plurality of crowds, and one or more issues based on the analysis in real-time;

suggesting, by the analysis module, one or more actions based on the crowd information; and displaying, by a display module, the predicted crowd information along with at least one of an alert and at least one indicator in real-time, wherein the crowd characteristics comprising one or more quantitative crowd characteristics and one or more qualitative crowd characteristics, wherein the one or more quantitative crowd characteristics comprises a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive.

10. The method of claim 9 further comprising:
analysing, by the analysis module, the crowd data to create a context for the analysis of crowd behaviour; and
examining and measuring, by the analysis module, a relationship between two quantitative metrics and one qualitative assessment to increase predictability of crowd information comprising the crowd behaviour.

11. The method of claim 10 further comprising:
displaying, by the display module, the one or more actions; and
displaying, by the display module, the crowd information and the one or more actions as a graphical representation, wherein the display module displays at least one of the crowd information, the one or more actions and the one or more suggestions as a graphical representation.

12. The method of claim 10 further comprising:
predicting, by the analysis module, the one or more patterns and changes in mood of the plurality of crowds based on predictive Bayesian network;
measuring, by the analysis module, the crowd characteristics by using artificial intelligence and convolutional neural networks (CNN);
measuring, by the analysis module, a speed of change in the crowd density, flow and mood of the plurality of crowds in the zones, a trend and a rate of the trend in the crowd density, flow and mood; and
predicting, by the analysis module, the one or more issues comprising possible crowd congestion and crowd crush risks based on the speed of change in the crowd density, crowd flow and crowd mood.

13. The method of claim 9 further comprising receiving, by the data collection module, the crowd data from a plurality of observers present in the plurality of zones via a computing device and a network.

14. The method of claim 9 further comprising continually improving, by a machine learning module, an accuracy and predictive capability of the real-time crowd measurement and management system.

15. The method of claim 9, wherein facial features and personal information of the plurality of people in the plurality of crowds are not recorded or retained while capturing the crowd data of the plurality of crowds.

16. A real-time crowd measurement and management system comprising:
a data collection module comprising a plurality of data capturing devices installed in a plurality of zones, the plurality of data capturing devices are configured to continuously observe and collect first set of crowd data comprising quantitative data and qualitative data of a plurality of crowds, wherein each of the plurality of crowds comprising a plurality of people, wherein the data collection module is further configured to receive a second set of crowd data from a plurality of observers present at the plurality of zones via a computing device and a network, wherein the data capturing devices are configured not to record any facial features and personal information of the plurality of people in the plurality of crowds;
an analysis module configured to:
use artificial intelligence and convolutional neural networks (CNN) to identify a plurality of crowd characteristics from the first set of crowd data and the second set of crowd data, wherein the crowd characteristics comprising one or more quantitative crowd characteristics and one or more qualitative crowd characteristics, wherein the crowd characteristics comprising at least one of a crowd density, a crowd flow, and a crowd mood;
analyse the captured crowd data to determine one or more patterns and changes in mood of the plurality of crowds and create a context for the analysis of crowd behaviour;
examine and measure a relationship between two quantitative crowd characteristics and one qualitative assessment to increase predictability of crowd information comprising behaviour;
predict crowd information comprising at least one of one or more emergent crowd characteristics, an emergent crowd behaviour of the plurality of crowds, and one or more issues based on the analysis in real-time; and
suggest one or more actions for managing the plurality of crowds based on the crowd information;
a display module configured to display the one or more actions and the predicted crowd information along with at least one of an alert and at least one indicator in real-time, wherein the at least one indicator comprising a colour indicator for denoting the crowd information comprising crowd feeling in real-time; and
a machine learning module configured to continually improve an accuracy and predictive capability of the real-time crowd measurement and management system.

17. The real-time crowd measurement and management system of claim 16, wherein the one or more quantitative crowd characteristics comprises a number of people in density (ppsqm i.e. people per square metre), the crowd movement of people (ppmpm i.e. people per metre per minute) i.e. speed and direction of people movement(s), and a mood score from negative, negative-neutral, neutral, neutral-positive to positive.

18. The real-time crowd measurement and management system of claim 17, wherein the analysis module is further configured to:
- determine the one or more patterns and changes in mood of the plurality of crowds based on predictive Bayesian network;
- measure the crowd characteristics by using artificial intelligence and convolutional neural networks (CNN);
- measure a speed of change in the crowd density, flow and mood of the plurality of crowds in the zones, a trend and a rate of the trend in the crowd density, flow and mood; and
- indicate possible crowd congestion and crowd crush risks based on the speed of change in the crowd density, crowd flow and crowd mood.

19. The real-time crowd measurement and management system of claim 17 further comprising a notification module configured to send notification and programmed alerts to users of the real-time crowd measurement and management system.

20. The real-time crowd measurement and management system of claim 16, wherein the display module is further configured to display at least one of the crowd information, the one or more actions, and the one or more suggestions as a graphical representation.

* * * * *